(12) United States Patent
Guemmer

(10) Patent No.: US 10,337,524 B2
(45) Date of Patent: Jul. 2, 2019

(54) GROUP OF BLADE ROWS

(71) Applicant: Rolls-Royce Deutschland Ltd & Co KG, Blankenfelde-Mahlow (DE)

(72) Inventor: Volker Guemmer, Mahlow (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 920 days.

(21) Appl. No.: 14/626,665

(22) Filed: Feb. 19, 2015

(65) Prior Publication Data
US 2015/0240836 A1 Aug. 27, 2015

(30) Foreign Application Priority Data

Feb. 27, 2014 (DE) .................... 10 2014 203 601

(51) Int. Cl.
| | |
|---|---|
| F01D 5/14 | (2006.01) |
| F04D 29/54 | (2006.01) |
| F04D 29/18 | (2006.01) |
| F04D 29/32 | (2006.01) |
| F04D 29/38 | (2006.01) |

(52) U.S. Cl.
CPC ........... *F04D 29/544* (2013.01); *F01D 5/142* (2013.01); *F01D 5/145* (2013.01); *F01D 5/146* (2013.01); *F04D 29/181* (2013.01); *F04D 29/324* (2013.01); *F04D 29/384* (2013.01); *Y02T 50/673* (2013.01)

(58) Field of Classification Search
CPC .... F04D 29/544; F04D 29/181; F04D 29/324; F01D 5/142; F01D 5/145; F01D 5/146
See application file for complete search history.

(56) References Cited

U.S. PATENT DOCUMENTS

| | | | |
|---|---|---|---|
| 3,937,592 A | 2/1976 | Bammert | |
| 4,483,659 A * | 11/1984 | Armstrong | .............. F01D 5/142 415/181 |
| 8,534,997 B2 | 9/2013 | Guemmer | |

(Continued)

FOREIGN PATENT DOCUMENTS

| | | |
|---|---|---|
| DE | 102009013399 | 9/2010 |
| EP | 2261463 | 12/2010 |

(Continued)

OTHER PUBLICATIONS

European Search Report dated Jul. 23, 2015 from counterpart European Application No. 15156112.

(Continued)

*Primary Examiner* — Kayla McCaffrey
(74) *Attorney, Agent, or Firm* — Shuttleworth & Ingersoll, PLC; Timothy Klima

(57) ABSTRACT

The present invention relates to a blade row group arrangeable in a main flow path of a fluid-flow machine and including N adjacent member blade rows firmly arranged relative to one another in both the meridional direction (m) and the circumferential direction (u), with the number N of the member blade rows being greater than/equal to 2 and (i) designating the running index with values between 1 and N. Here, a front member blade row with front blades (i) having a leading edge and a trailing edge as well as a rear member blade row with rear blades (i+1) having a leading edge and a trailing edge are provided.

17 Claims, 10 Drawing Sheets

(56) References Cited

U.S. PATENT DOCUMENTS

| | | |
|---|---|---|
| 2011/0318172 A1 | 12/2011 | Hoeger |
| 2013/0209223 A1 | 8/2013 | Gomez et al. |
| 2013/0209224 A1 | 8/2013 | Gomez et al. |
| 2013/0209241 A1 | 8/2013 | Gomez et al. |
| 2013/0209259 A1 | 8/2013 | Gomez et al. |

FOREIGN PATENT DOCUMENTS

| | | |
|---|---|---|
| EP | 2626515 | 8/2013 |
| WO | 2005040559 | 5/2005 |

OTHER PUBLICATIONS

German Search Report dated Mar. 26, 2014 from counterpart German App No. 10 2014 203 601.1.

* cited by examiner

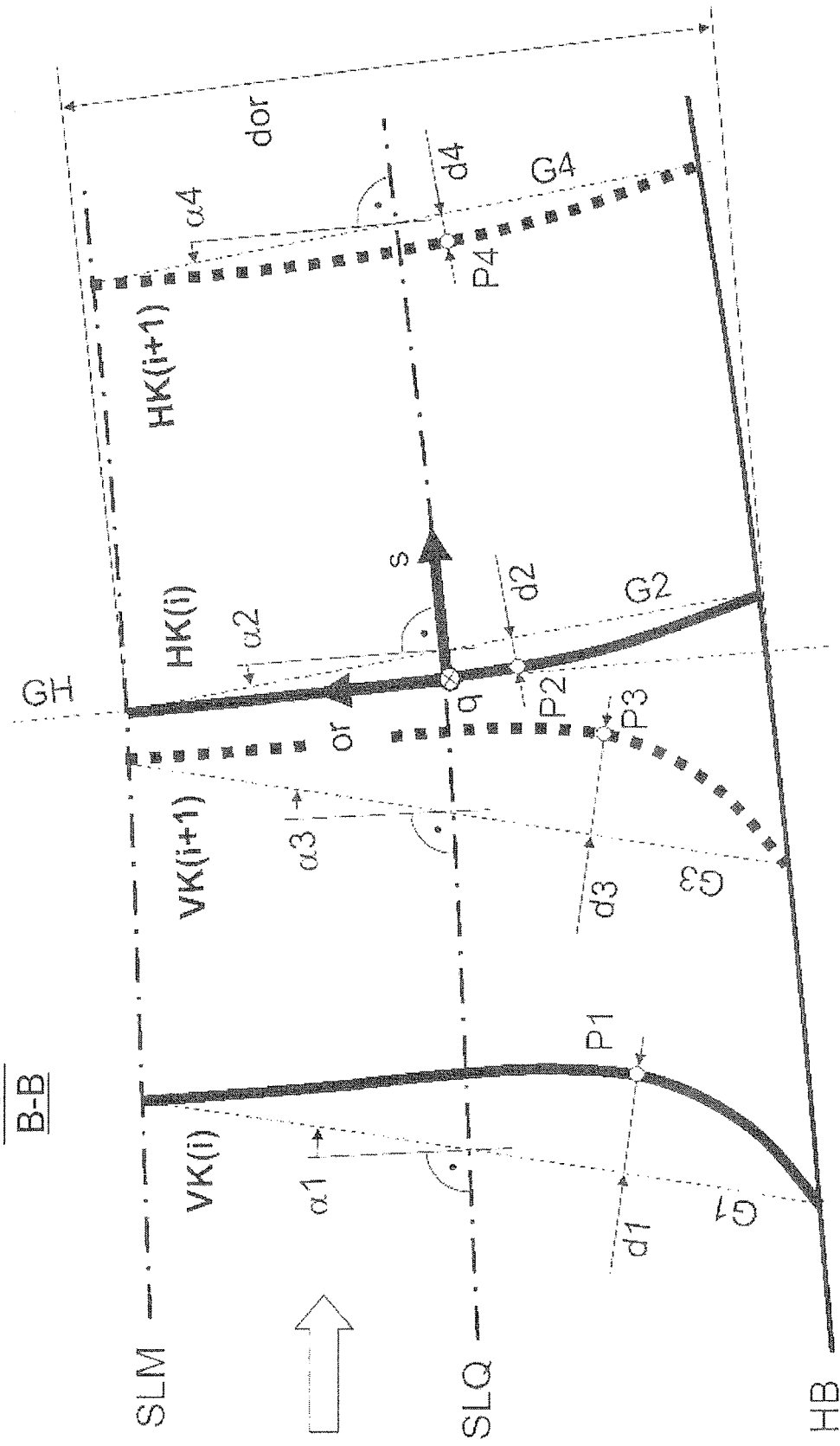

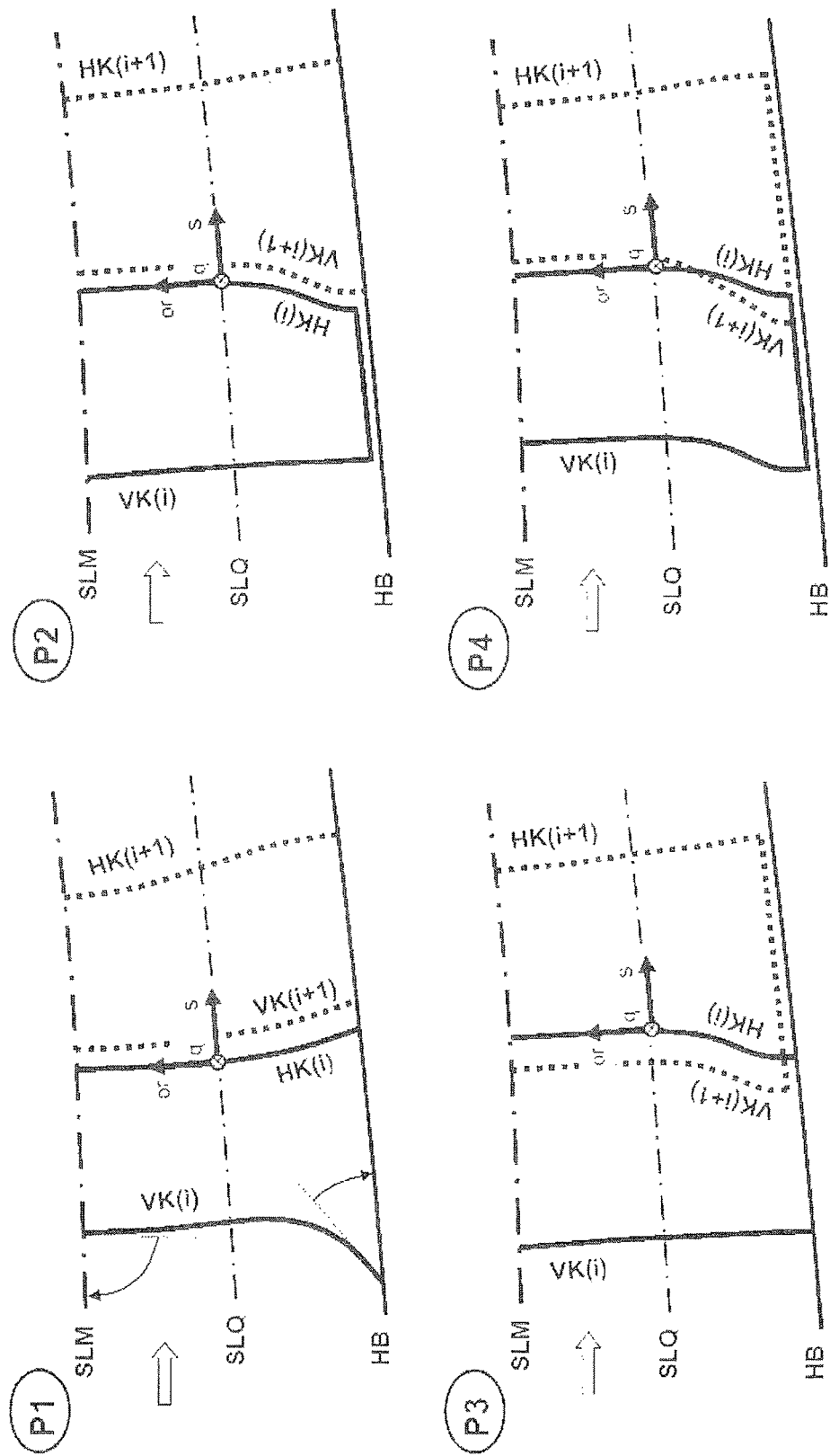
Fig. 6a  Views B-B

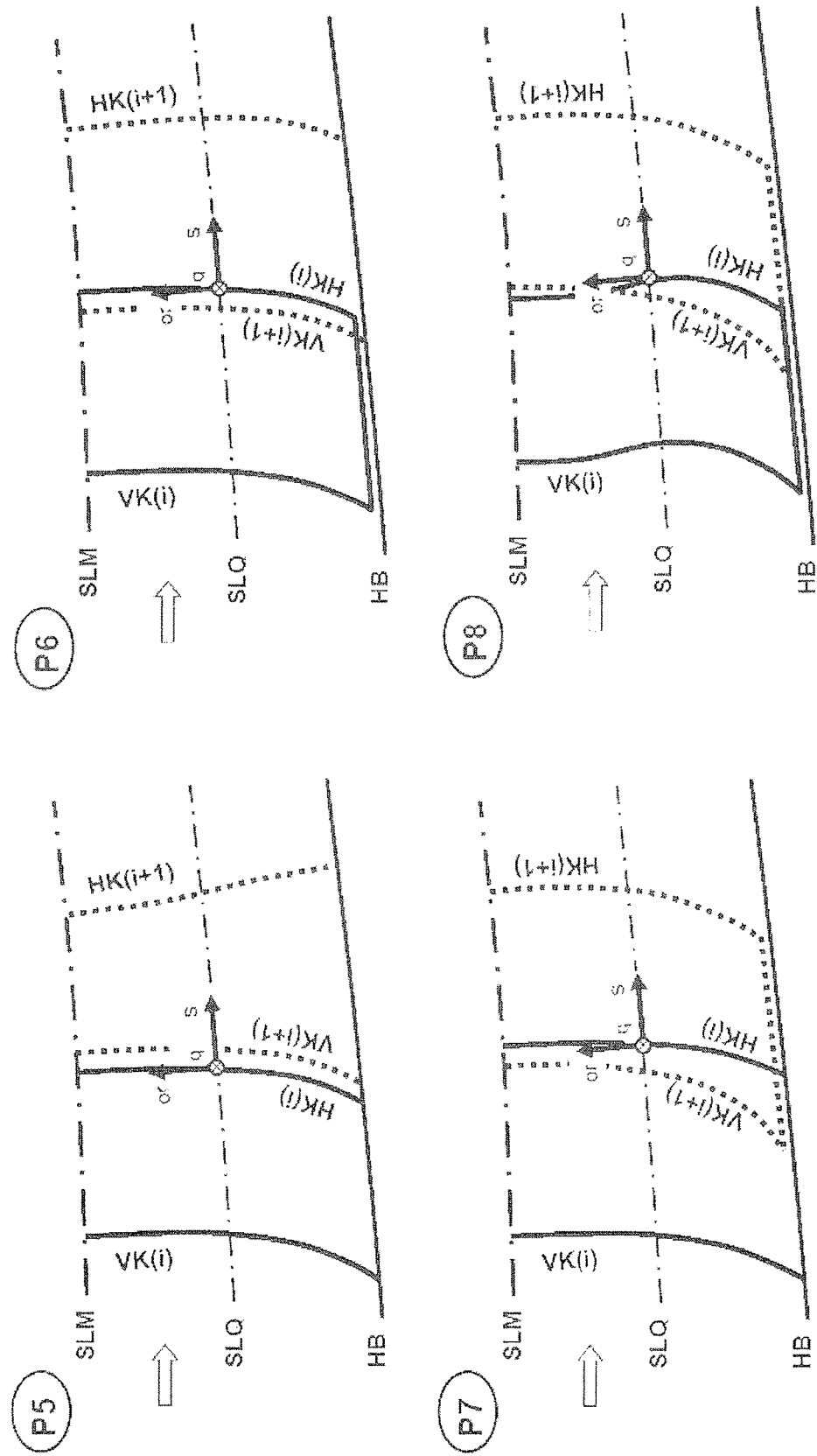

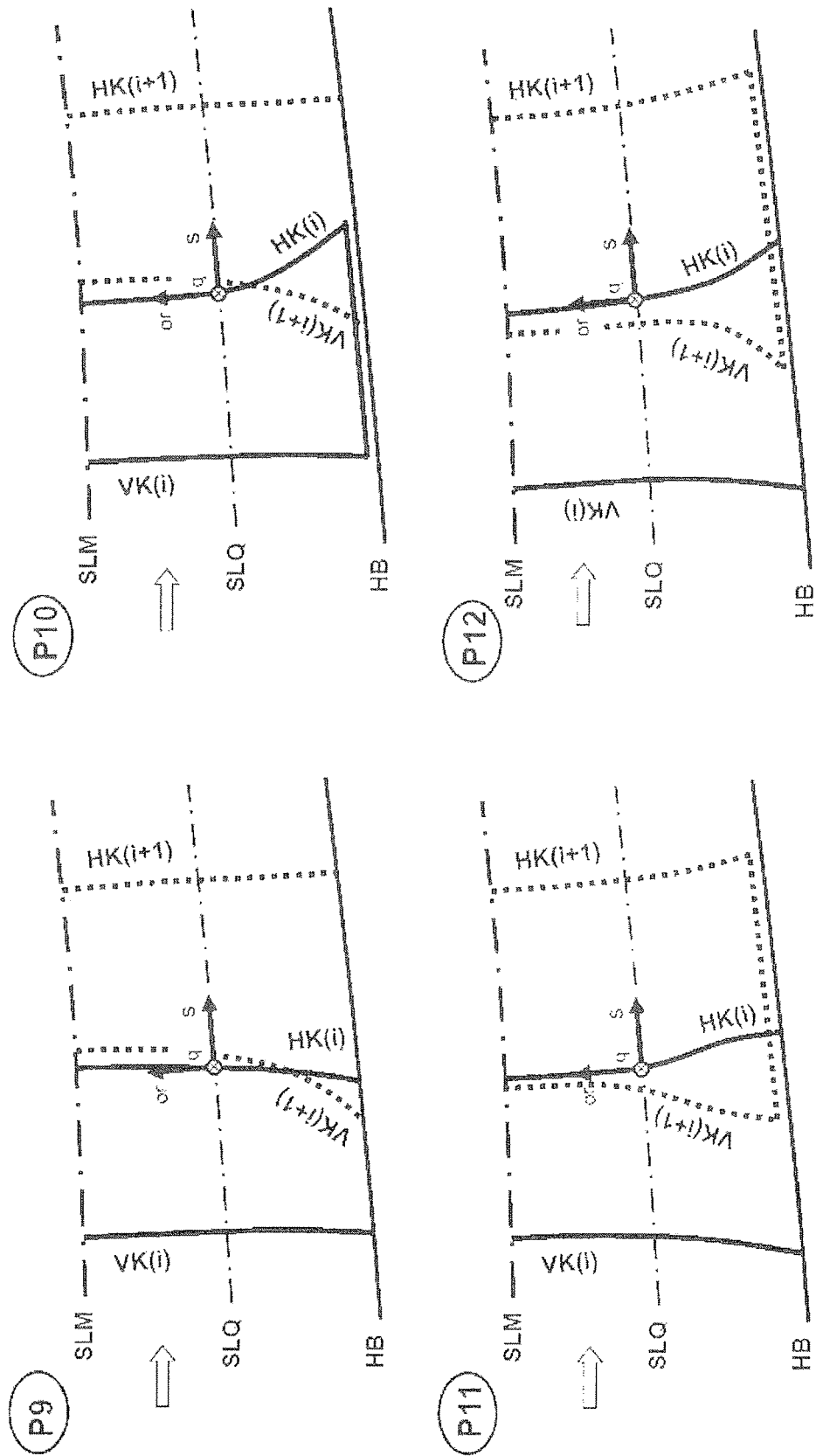
Fig. 6c Views B-B

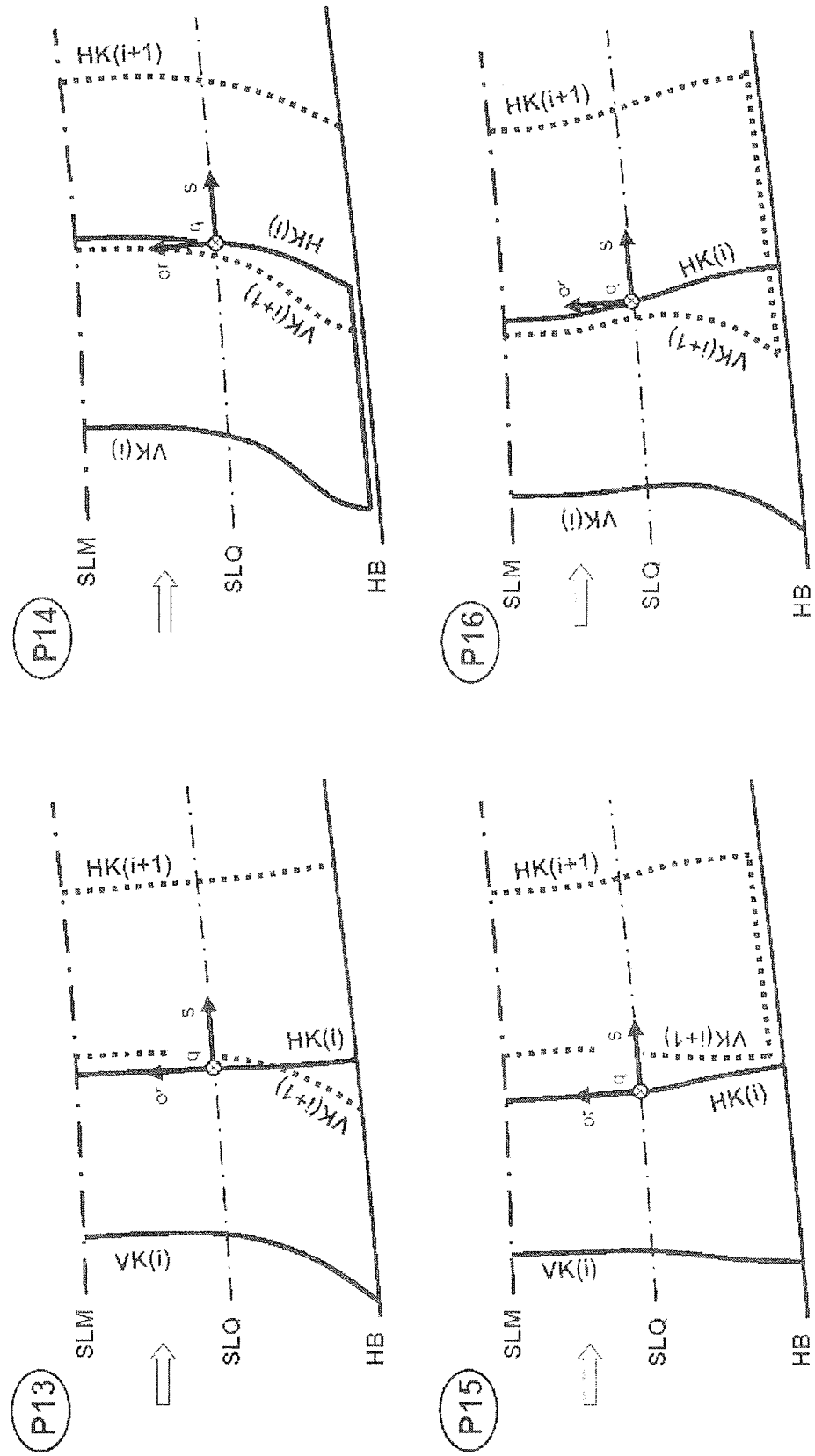
Fig. 6d Views B-B

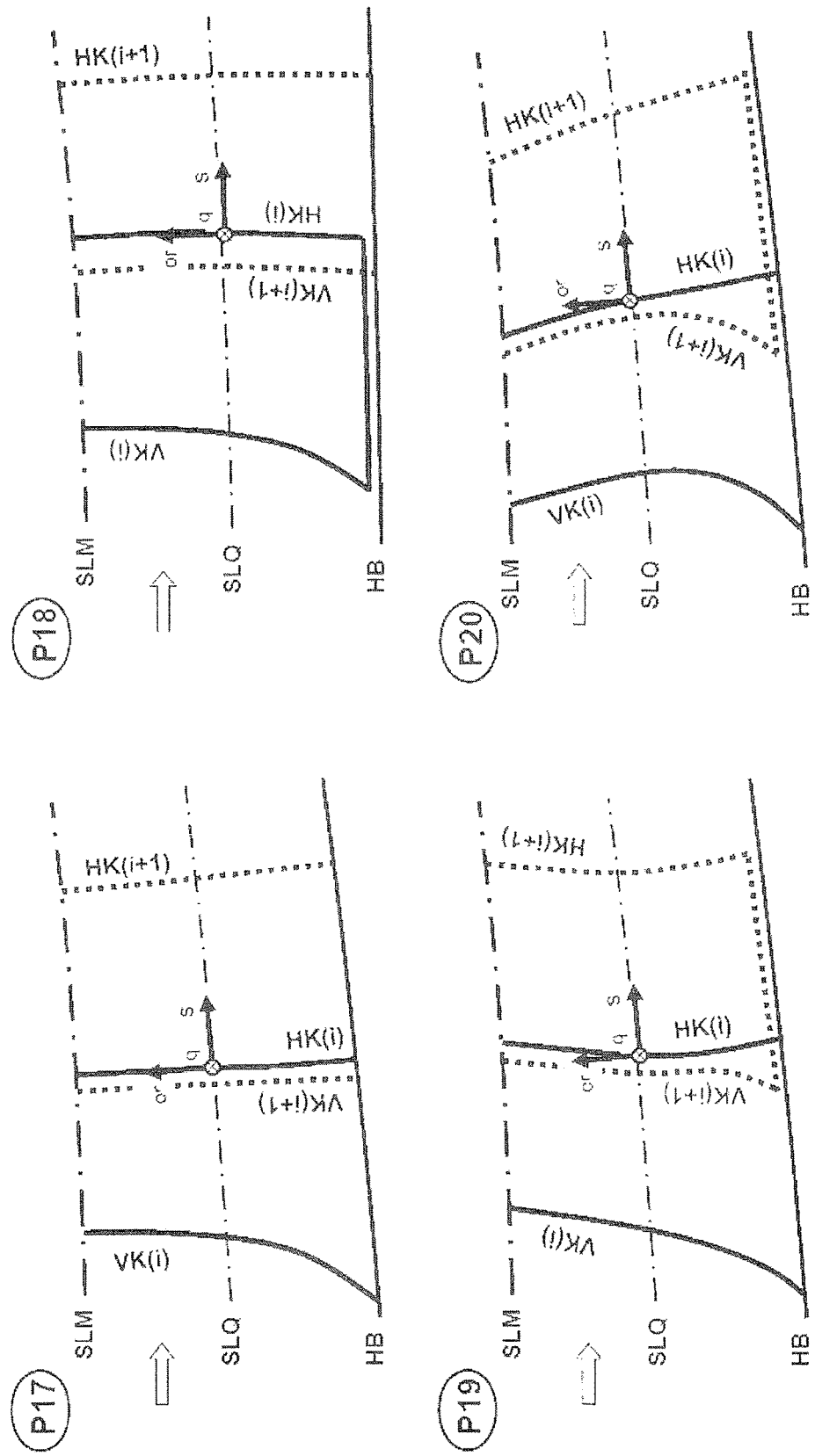
Fig. 6e Views B-B

GROUP OF BLADE ROWS

CROSS-REFERENCE TO RELATED APPLICATION

This application claims priority to German Patent Application No. 10 2014 203 601.1 filed on Feb. 27, 2014, the entirety of which is incorporated by reference herein.

BACKGROUND

This invention relates to a blade row group.

The aerodynamic loadability and the efficiency of fluid-flow machines, in particular blowers, compressors, turbines, pumps and fans, is limited by the growth and the separation of boundary layers near and on the hub and casing walls. To remedy this problem in the case of high aerodynamic loading and important boundary layer growth on the annulus duct side walls (hub or casing), the state of the art provides solutions only to a limited extent.

State of the art in fluid-flow machines are arrangements with double-row stator wheels, usually employed as exit stator wheels in compressors, or also double-row rotor arrangements in which directly adjacent rotors operate counter-rotatingly, or in which two directly adjacent rotor blade rows are attached to a common drum. A fluid-flow machine of this type is known for example from EP 2 261 463 A2. With these arrangements, and in particular with those having several, directly adjacent blade rows firmly arranged relative to one another (for example several rotor blade rows on the same drum, or several stator vane rows), severe boundary layer separation occurs at higher aerodynamic loading in the boundary zone of the main flow path, i.e. at the hub or casing contour.

The problems in the edge areas are primarily due to the fact that the favourable arrangement of two adjacent blade edges of a blade row group in the center of the main flow path has an unfavourable effect in the vicinity of the flow path boundary. Also, design rules known from individual blade rows are not applicable. New rules must be devised for blade row groups. In particular, the required flow deflection may quickly be so high either in parts of the blade height or along the entire blade height that the conventional arrangement of a blade row group leads to a separated boundary layer flow in the edge areas of the main flow path on the hub and/or the casing walls.

It is known from US 2013/0209223 A1 to vary the meridional overlap between front and rear blades of a blade row group between the center of the main flow path and the main flow path boundary. From US 2013/0209224 A1 it is known to vary the degree of overlap between front and rear blades of a blade row group as well as the distance of adjacent edges of the front and rear blades between the center of the main flow path and the main flow path boundary.

A variation of the overlap and of the distance is usually obtained with every configuration of a blade row group, without this necessarily having an advantageous effect on the flow. US 2013/0209241 A1 and US 2013/0209224 A1 describe most different possibilities for variation, without using aerodynamically significant parameters or furnishing the engineer with evaluations of the possible variations. No technical teachings relating to stipulation of the precise shape for all blade edges of two adjacent member blade rows are provided, although these are of crucial importance for favourably influencing the overall flow behaviour. US 2013/0209223 A1 deals with the edge spacing of adjacent member blade rows in the meridional plane (machine side view). The flow direction in blade rows has however a sometimes considerable flow swirl component, so that the blading may be considerably inclined relative to the meridional direction. Crucial for the aerodynamic behaviour, however, is a fixing of the blade edges in a view perpendicular and parallel to the blade profile chord. A blade edge visible in the meridional plane can therefore be generated by an infinite number of different blade edge shapes fixed in the aerodynamically relevant chord and chord-orthogonal directions. It cannot therefore clearly describe the shape of the blade edges, and accordingly cannot solve the aerodynamic problem of achieving an advantageous effect on the flow.

SUMMARY

An object underlying the present invention is to provide a blade row group that achieves a favourable flow behaviour due to the fixing of edge shapes and relationships between the edges of two adjacent member blade rows both in the center area and in the edge areas of the main flow path.

It is a particular object of the present invention to provide solution to the above problems by a blade row group having the features as described herein.

Accordingly, the solution in accordance with the invention provides a blade row group consisting of at least two adjacent blade rows firmly arranged relative to one another (several co-rotating rotor blade rows or several stator vane rows), which can be arranged in a main flow path of a fluid-flow machine. Here, the leading edge of at least one blade of the rear member blade row is provided in the vicinity of a blade of the front member blade row, where between the pressure side of the blade and the suction side of the blade a secondary passage can be formed, if applicable.

Since the blade edge shapes of the blades involved and the shapes of the individual edges relative to one another are highly relevant to favourable flow guidance and to blade height-dependent exploitation of the potential effects in the aerodynamically important interference area of the two member blade rows, it is provided in accordance with the invention that there is a qualitative equality with regard to the edge type in the area between the mean meridional flow line SLM (in the main flow path center) and one of the main flow path boundaries, hub and casing, in a defined view for at least two edges of the blade row group.

The solution in accordance with the invention permits favourable flow guidance and blade height-dependent exploitation of the potential effects in the aerodynamically important interference area of adjacent member blade rows, in that it provides for common characteristics in several blade edges with regard to their edge type.

A qualitative equality of two blade edges exists here when the blade edges are of the same edge type or are, when mirror-inverted, of the same edge type (i.e. after mirror inversion of one of two edges considered, the two edges considered are of the same edge type). The blade edges can here each be associated with one edge type in a plurality of edge types that are defined by the curvature of the edge contour and/or by the number of curvature changes of the blade edge and/or by the degree of bulge of the blade edge. In particular, the following edge types are defined:

Edge type A: there is a substantially linear course, with a very small degree of bulge of WG<0.003.

Edge type B: there is a slightly curved course, with a small degree of bulge of 0.003<WG<0.01.

Edge type C: there is an at least partially curved course, without curvature change and with a degree of bulge of WG>0.01 and with a section having a concave curvature in the upstream direction.

Edge type D: there is an at least partially curved course, without curvature change and with a degree of bulge of WG>0.01 and with a section having a convex curvature in the upstream direction.

Edge type E: there is an at least partially curved course, with a curvature change and with a degree of bulge of WG>0.01 and with a section having a concave curvature in the upstream direction between the curvature change point and the main flow path boundary HB.

Edge type F: there is an at least partially curved course, with a curvature change and with a degree of bulge of WG>0.01 and with a section having a convex curvature in the upstream direction between the curvature change point and the main flow path boundary HB.

Edge type G: there is an at least partially curved course, with two curvature changes and with a degree of bulge of WG>0.01 and with a section having a concave curvature in the upstream direction between the two curvature change points.

Edge type H: there is an at least partially curved course, with two curvature changes and with a degree of bulge of WG>0.01 and with a section having a convex curvature in the upstream direction between the two curvature change points.

In accordance with an embodiment of the invention, it is provided that in the blade row group in accordance with the invention the trailing edge of the front blade is of the edge type D. In a further embodiment it is provided that the trailing edge of the front blade is of the edge type E.

The present invention relates to blades of fluid-flow machines, such as blowers, compressors, pumps, fans and turbines of the axial, semi-axial and radial type using gaseous or liquid working medium. The fluid-flow machine may include one or several stages, each stage having a rotor and a stator, in individual cases, the stage is formed by a rotor only. The rotor includes a row of blades or several adjacent blade rows forming a group, which are connected to the rotating shaft of the machine and exchange energy with the working medium. An application in fluid-flow machines where the rotor transfers energy to the working medium is favourable in accordance with the invention. The rotor may be provided with shroud or running gap at the outer blade end. The stator includes a row of stationary vanes or several adjacent vane rows forming a group, which may either feature a fixed or a free vane end with gap on the hub and on the casing side.

Rotor drum and blading are usually enclosed by a casing, in other cases (e.g. aircraft or ship propellers) no such casing exists. The machine may also feature a stator, a so-called inlet guide vane assembly, upstream of the first rotor. Departing from the stationary fixation, at least one stator or inlet guide vane assembly may be rotatably borne, to change the angle of attack. Variation is accomplished for example via a spindle accessible from the outside of the annulus duct. In an alternative configuration, multi-stage types of said fluid-flow machine may have two counter-rotating shafts, with the direction of rotation of the rotor blade rows alternating between stages. Here, no stators exist between subsequent rotors. Finally, the fluid-flow machine may—alternatively—feature a bypass configuration such that the single-flow annulus duct divides into two concentric annuli behind a certain blade row, with each of these annuli housing at least one further blade row.

BRIEF DESCRIPTION OF THE DRAWINGS

The present invention is more fully described in the following with reference to the figures of the accompanying drawing showing several exemplary embodiments.

FIG. 5 shows definitions in accordance with the present invention in view B-B from FIG. 4.

FIG. 6a shows blade group arrangements in accordance with the present invention in view B-B.

FIG. 6b shows further blade group arrangements in accordance with the present invention in view B-B.

FIG. 6c shows further blade group arrangements in accordance with the present invention in view B-B.

FIG. 6d shows further blade group arrangements in accordance with the present invention in view B-B.

FIG. 6e shows further blade group arrangements in accordance with the present invention in view B-B.

DETAILED DESCRIPTION

Figure 1:
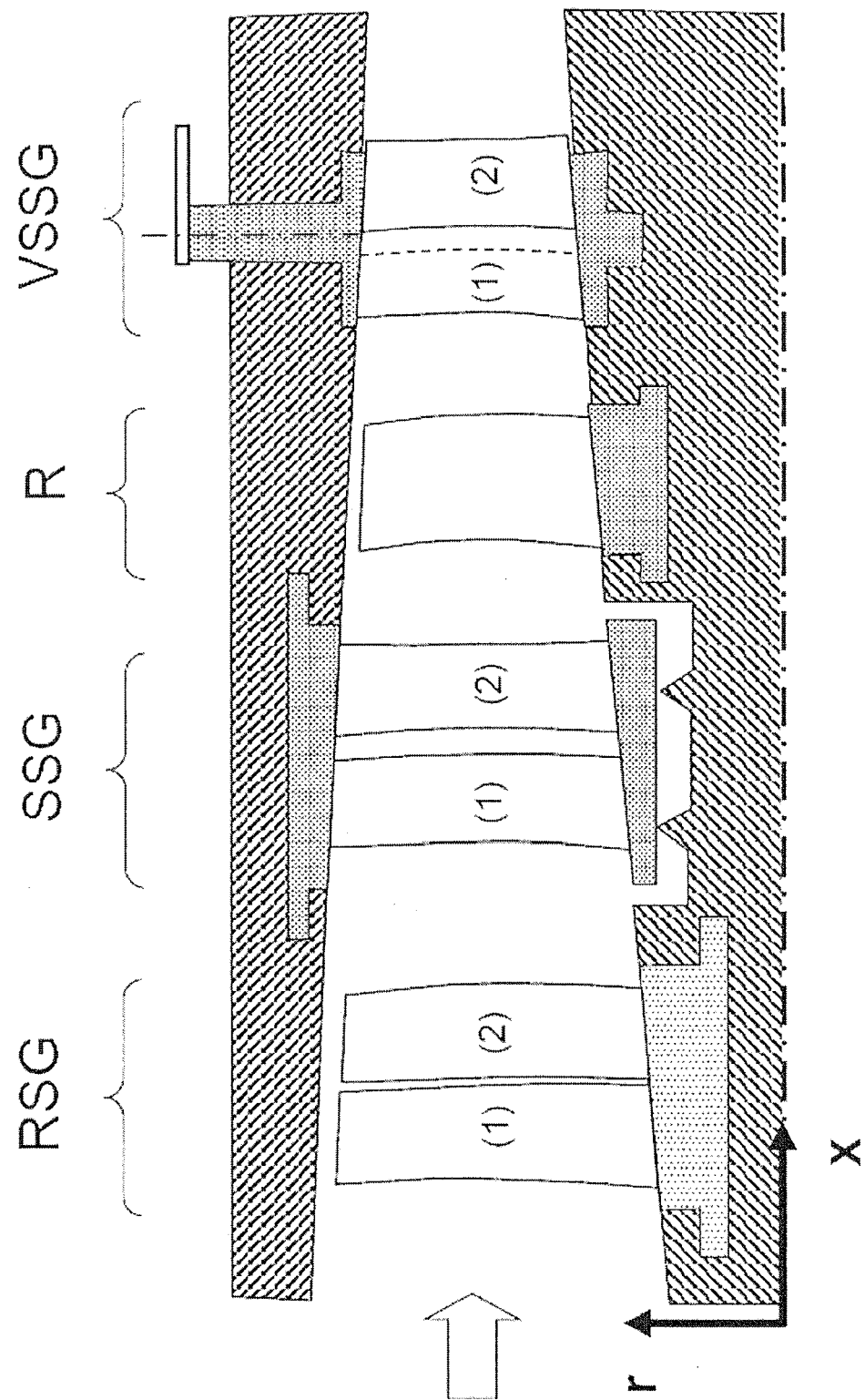
FIG. 1 shows several blade row groups in accordance with the state of the art.

A conventional blade row group according to the state of the art, as shown in FIG. 1, has no special features in respect of the shape of the blade edges. In particular, there is no special shape of the blade row group arising from particular relationships between individual blade edges. There are no further design features which could however be innovatively developed by a more complex exploitation of the arrangement as a blade row group. A blade row group as considered here has, unlike an individual blade row, a relatively far higher load on the side wall boundary layers, which has to be compensated for by specific additional measures. A special blade edge shape and matching of the edges relative to one another in the area of the blade ends under the special aerodynamic effect due to the arrangement as a blade row group therefore offers a way of extending the operating range of blade row groups.

FIG. 1 shows, in the meridional plane established by the axial direction x and the radial direction r, several blade row groups, with each of the blade row groups including two similar member blade rows showing no variation in their relative arrangement to one another (both circumferentially and meridionally). This relates therefore to double-row stator wheels or rotor wheels.

Accordingly, a rotor blade row group RSG includes two rotor blade rows rotating at the same speed and being connected to each other; the first member of the group is marked (1) and the second member of the group is marked (2). A stator vane row group SSG includes two directly adjacent stationary stator vane rows (1) and (2).

A variable stator vane row group VSSG includes two directly adjacent stator vane rows (1) and (2), with one vane of the front row and one vane of the rear row being each provided on a common rotary base and thus jointly settable about the rotary axis.

All blade row groups according to the state of the art have in common that there is no targeted shaping of the blade edges, and no advantageous correlating of the individual blade edge shapes. Also, the latter are usually viewed in the meridional plane (x-r) or the axial plane (r-u), which do not permit any conclusions to be drawn about properties in the aerodynamically crucial reference system parallel or perpendicular to the profile chord of a blade section. It is therefore possible for example that two blade edges intersecting in the axial plane (x-r) have no contact or intersection point in the chord-parallel view. Furthermore, the state of the art lacks any technical teaching on the stipulation of important quantities in the viewing planes (parallel or perpendicular to the profile chord) relevant for the flow-mechanical problems.

The solutions according to the state of the art are either unserviceable due to the lack of relevant criteria or are disadvantageous for the flow in the vicinity of the main flow path boundary (hub or casing).

The precise stipulation in accordance with the invention must accordingly be made in a system related to a profile chord direction. This method is described in detail further below. Each of the blade row groups in accordance with the invention also includes here two member blade rows that are similar and do not change their positions relative to one another.

Accordingly, a rotor blade row group RSG in accordance with the present invention includes at least two rotor blade rows rotating at the same speed and being connected to each other. A stator vane row group SSG in accordance with the present invention includes at least two directly adjacent stationary stator vane rows.

A variable stator vane row group VSSG according to the present invention includes at least two directly adjacent stator vane rows. A vane of one of the member vane rows, together with at least one vane of its immediately downstream member vane row, can be provided on a common rotary base. Alternatively, at least two vanes appertaining to different member vane rows can also be arranged on an individual rotary base each.

Each of the blade row groups RSG, SSG and VSSG in accordance with the present invention can also have more than two member blade rows.

The described configuration of the blade row group includes the possibility that on at least one member blade row the distance between two adjacent blades varies along the circumference. It may also be favourable if the axial position of two adjacent blades of this blade row varies along the circumference. It may also be favourable if the profile depth of two adjacent blades of this blade row varies along the circumference.

It may be advantageous if the numbers of blades of two adjacent member blade rows are in a special ratio to each other, i.e. the number of blades of the member blade row (i) is a multiple of the number of blades of the member blade row (i+1), or the number of blades of the member blade row (i+1) is a multiple of the number of blades of the member blade row (i), or the number of blades of the member blade row (i) equals the number of blades of the member blade row (i+1). It may be particularly advantageous if the blade numbers of the rows (i) and (i+1) have a ratio of 1:2.

Figure 2:
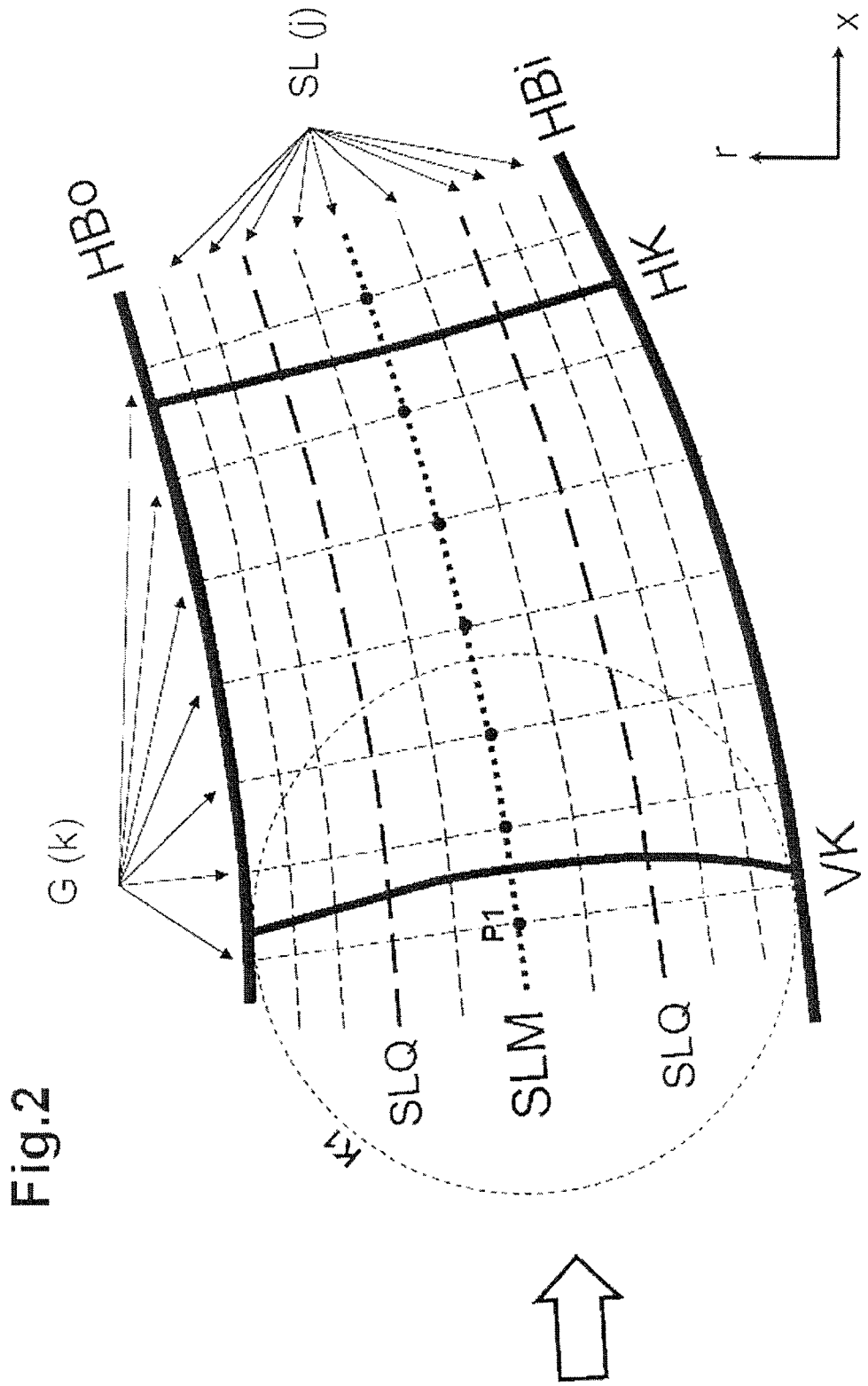
FIG. 2 shows the definition of meridional flow lines.

For the purpose of preparing definitions important in accordance with the present invention, FIG. 2 shows, for the definition of meridional flow lines, a main flow path of a fluid-flow machine with through-flow from left to right (indicated by the bold arrow) in the meridional plane established by the axial coordinate x and the radial coordinate r, where the main flow path is delimited by the radially inner main flow path boundary HBi and by the radially outer main flow path boundary HBo. The mean meridional flow line SLM is in the center between the radially inner main flow path boundary HBi and the radially outer main flow path boundary HBo. Its course matches the connection of the center points of circles inscribed in the main flow path, as is made clear by the example in the illustration for the first marked point P1 on the mean meridional flow line SLM and the appertaining circle K1. VK and HK indicate the leading edge and the trailing edge of a blade arranged in the main flow path.

There is a family of straight lines G(k) inside the main flow path whose members are each perpendicular to the mean meridional flow line SLM and end at the main flow path boundaries HB. Further meridional flow lines SL(j) are defined by the connection of points with an identical percentage subdivision of the straight lines G(k) between the main flow path boundaries HB in each case.

The rotation of a meridional flow line about the machine axis results in a meridional flow surface SF(j). The intersection of a meridional flow surface with a blade of the fluid-flow machine results in a meridional flow line section SLS(j). In the center between one of the main flow path boundaries HBi and HBo and the mean meridional flow line SLM, the quarter meridional flow line SLQ results in this way.

Figure 3:
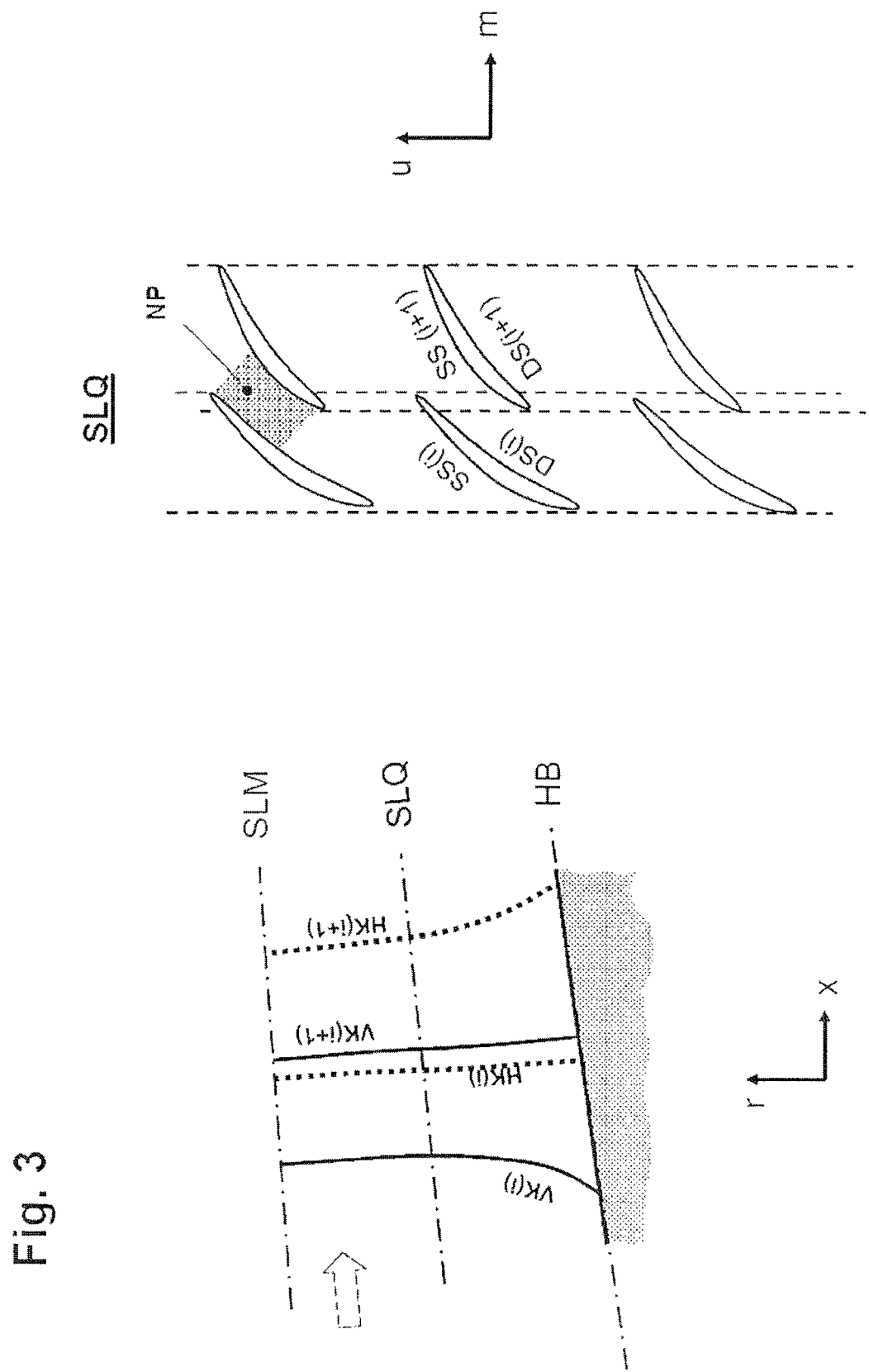
FIG. 3 shows a blade row group in accordance with the present invention including a circumferential view.

It can occur, depending on the blade shape, that the profile depths and blade edge shapes in the meridional plane (x,r) cannot be recorded quantitatively, or not at all. For that reason, they must be viewed in a profile chord direction-related coordinate system for stipulations in accordance with the invention. In this connection, FIG. 3 shows firstly on its left-hand side, by way of example, an arrangement of two adjacent member blade rows (i) and (i+1) appartaining to a blade row group in accordance with the invention in the meridional plane established by the axial direction x and the radial direction r. Shown is the inventive arrangement in the area between the main flow path center (mean meridional flow line SLM along the meridional direction m there) and a main flow path boundary HB. The main flow path boundary HB is a contour at the hub or at the casing of the fluid-flow machine, for example at a rotary base, a wall, a stator root, a stator shroud, a rotor root or a rotor shroud.

The main flow path boundary HB is either firmly connected to the end of at least one member blade row, or a gap is provided between the main flow path boundary and at least the end of a member blade row.

The arrangement shows the two member blade rows (i) and (i+1), each with two blade edges, leading edge VK(i) and trailing edge HK(i) or leading edge VK(i+1) and trailing edge HK(i+1).

The right-hand side of FIG. 3 shows the arrangement of the two member blade rows viewed in a meridional flow surface established by the meridional coordinate m and the circumferential direction u. An appropriate circumferential development is shown as an example for other meridional flow line sections on the mean meridional flow line blade section SLM in the main flow path center. For simplicity's sake (but not absolutely necessary in accordance with the invention), the two member blade rows here have the same blade numbers. Also advantageous is a blade number ratio of 1:2 for the rows (i) and (i+1), where every second blade of the row (i+1) can advantageously be arranged close to the pressure side of a blade of the row (i). The suction sides of the blades (i) and (i+1) are identified respectively with SS(i) and SS(i+1), and the pressure sides with DS(i) and DS(i+1).

The blades can advantageously be provided such that between the pressure side of a blade (i) and the suction side of a blade (i+1), a secondary passage (illustrated as a shaded area and identified with NP) is created.

It can be provided that in at least one area of the main flow path height from the leading edge VK(i+1) of the rear member blade row to the trailing edge HK(i) of the front member blade row a meridional meshing is provided whose amount increases in the direction of at least one of the main flow path boundaries HB in at least one partial section. A meridional meshing of this type can be provided for all exemplary embodiments of the invention.

Figure 4:
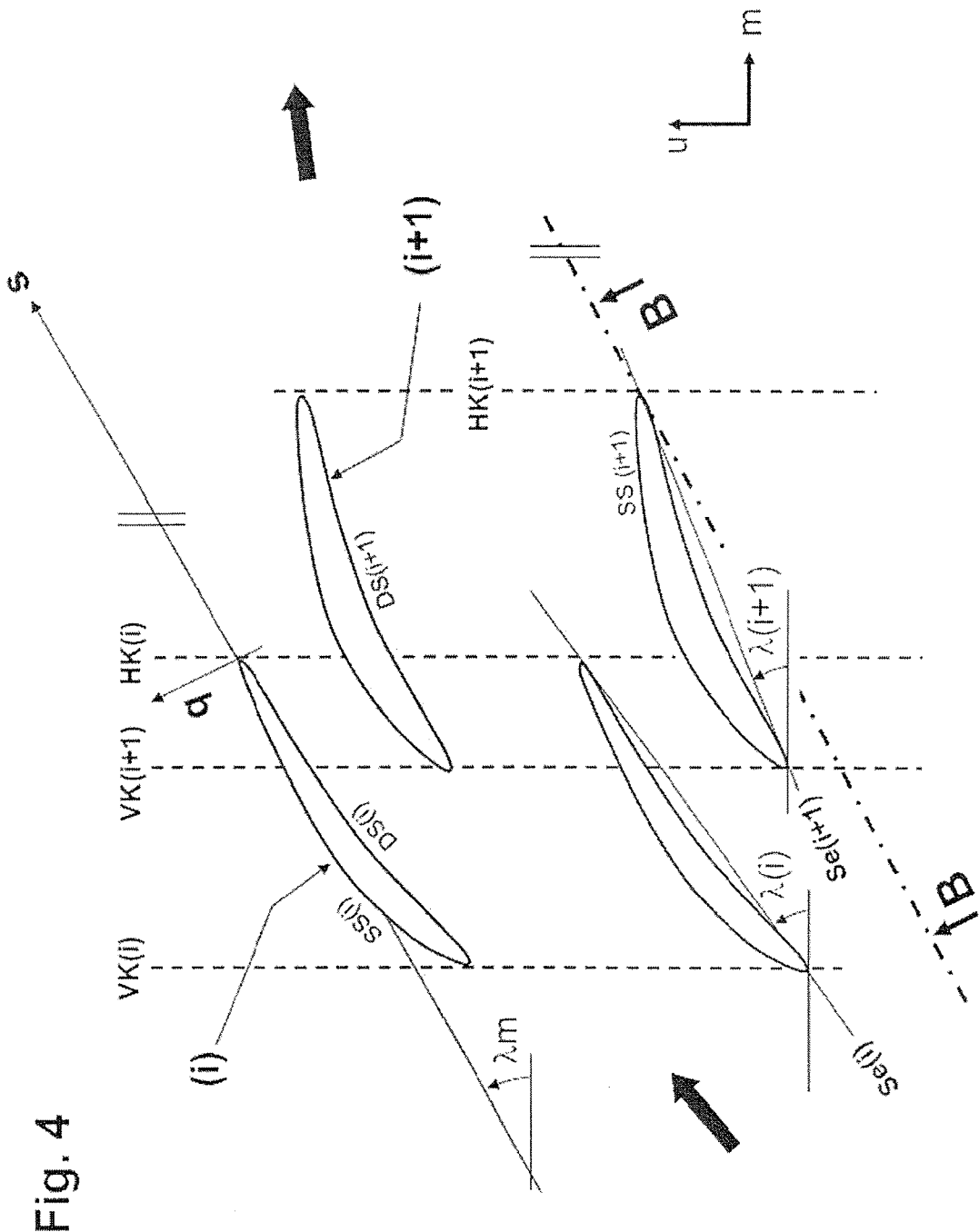
FIG. 4 shows definitions in accordance with the present invention in a meridional flow line section.

FIG. 4 shows, as does the right-hand side of FIG. 3, a meridional flow line blade section. The definitions of various relevant quantities and views in the plane established by the meridional direction m and by the circumferential coordinate u are provided. For simplification, only two blades and the intermediate blade main passage of the member blade rows (i) and (i+1) are shown in each case. The main flow direction is identified by bold black arrows. The connecting lines of the blade edges are accordingly identified with VK(i), HK(i), VK(i+1) and HK(i+1). Each blade profile is shown with its suction side SS and its pressure side DS. It is pointed out that for purposes of a clearer illustration in FIG. 4 and also in the other figures, no distinction is made between the identification of the member blade rows (i) and (i+1) and the identification of the individual blades in the member blade rows, i.e. the blades too are identified with (i) and (i+1).

The chord Se(i) of the front blade is defined as the tangent lying on the profile of the blade (i) on the pressure side. The chord Se(i+1) of the rear blade is defined as the tangent lying on the profile of the blade (i+1) on the pressure side.

The stagger angle of the front blade lambda(i) ($\lambda$i) is defined as the angle of inclination of the chord of the front blade S(i) relative to the meridional direction m. The stagger angle of the rear blade lambda(i+1) ($\lambda$i+1) is defined as the angle of inclination of the chord of the rear blade S(i+1) relative to the meridional direction m. The mean stagger angle lambdam ($\lambda$m) is defined as the mean value of the stagger angles lambda(i) and lambda(i+1), in accordance with: lambdam=(lambda(i)+lambda(i+1))/2.

The coordinate direction s is inclined with lambdam relative to the meridional direction m and faces downstream. The coordinate direction q is perpendicular to s, and its orientation leads away from the pressure side of the blade (i). The coordinate direction or is perpendicular to s and q.

For the definition of the view B-B, it is assumed that the meridional flow line blade section shown in FIG. 4 is located on the quarter meridional flow line SLQ. The mean chord direction identified by the coordinate direction s is representative of the local main flow direction in the flow-mechanical interference area of the blades (i) and (i+1). A fixed relationship to this aerodynamically identified and important mean chord direction is therefore essential for stipulating characteristic features of a blade row group that are correct in terms of flow mechanics. For this reason, the blade edges and their describing parameters are defined in the coordinate system (s-q) of the mean chord direction s and their orthogonals q (tangentially relative to the meridional flow surface appertaining to SLQ). In view B-B all blade edges of a blade row pairing (i), (i+1) can be usefully assessed and described in terms of their flow-mechanical effect.

The view B-B is tangential to the mean meridional flow section (conical surface around the machine axis) and perpendicular to the mean chord direction—identified by the coordinate direction s—of the blade arrangement in the meridional flow line blade section at SLQ.

FIG. 5 shows as bold unbroken lines the edges of the front blade and as bold dotted lines the edges of the rear blade in the area between the main flow path boundary HB and the mean meridional flow line SLM defined with half the blade height, in the s-or plane (view B-B). In addition, the quarter meridional flow line SLQ is shown, where the coordinate origin is arranged at the intersection point of SLQ with the trailing edge of the front blade HK(i), and the coordinate direction or is orthogonal to the meridional flow surface passing through SLQ. The coordinate direction s extends parallel to SLQ. The coordinate direction or extends orthogonal to SLQ and not mandatorily parallel to HK(i). The main flow direction is indicated by a bold arrow.

Using the four auxiliary straight lines G1, G2, G3 and G4, important descriptive parameters for the blade edges of the member blade rows (i) and (i+1) are defined. An auxiliary straight line passes in each case through the intersection points of a blade edge with the mean meridional flow line SLM and the main flow path boundary HB: G1 for the edge VK(i), G2 for the edge HK(i), G3 for the edge VK(i+1) and G4 for the edge HK(i+1).

The distance dor between SLM and HB is measured orthogonally to the quarter meridional flow line SLQ at the intersection point with the trailing edge line HK(i) (in the direction of or and perpendicular to s), with the auxiliary straight line GH having the SLQ-orthogonal direction.

The degree of bulge WG1 of the leading edge line VK(i) is defined as the greatest ascertainable distance d1 between the leading edge line VK(i) itself and the auxiliary straight line G1 (maximum bulge d1) relative to the distance dor, in accordance with WG1=d1/dor.

The tilt angle alpha1 of the leading edge line VK(i) is defined between the auxiliary straight line G1 and the orthogonal of the quarter meridional flow line SLQ at the intersection point with the auxiliary straight line G1, and is positively counted clockwise, when the blade row group is viewed with a flow from left to right and with the main flow path boundary HB being the lower limit as illustrated. The point of maximum edge bulge on the leading edge line VK(i) is identified with P1.

The degree of bulge WG2 of the trailing edge line HK(i) is defined as the greatest ascertainable distance d2 between the trailing edge line HK(i) itself and the auxiliary straight line G2 (maximum bulge d2) relative to the distance dor, in accordance with WG2=d2/dor.

The tilt angle alpha2 of the trailing edge line HK(i) is defined between the auxiliary straight line G2 and the orthogonal of the quarter meridional flow line SLQ at the intersection point with the auxiliary straight line G2, and is positively counted clockwise, when the blade row group is viewed with a flow from left to right and with the main flow path boundary HB being the lower limit as illustrated. The point of maximum edge bulge on the trailing edge line HK(i) is identified with P2.

The degree of bulge WG3 of the leading edge line VK(i+1) is defined as the greatest ascertainable distance d3 between the leading edge line VK (i+1) itself and the auxiliary straight line G3 (maximum bulge d3) relative to the distance dor, in accordance with WG3=d3/dor.

The tilt angle alpha3 of the leading edge line VK(i+1) is defined between the auxiliary straight line G3 and the orthogonal of the quarter meridional flow line SLQ at the intersection point with the auxiliary straight line G3, and is positively counted clockwise, when the blade row group is viewed with a flow from left to right and with the main flow path boundary HB being the lower limit as illustrated. The point of maximum edge bulge on the leading edge line VK(i+1) is identified with P3.

The degree of bulge WG4 of the trailing edge line HK(i+1) is defined as the greatest ascertainable distance d4 between the trailing edge line HK(i+1) itself and the auxiliary straight line G4 (maximum bulge d4) relative to the distance dor, in accordance with WG4=d4/dor.

The tilt angle alpha4 of the trailing edge line HK(i) is defined between the auxiliary straight line G4 and the orthogonal of the quarter meridional flow line SLQ at the intersection point with the auxiliary straight line G4, and is positively counted clockwise, when the blade row group is viewed with a flow from left to right and with the main flow path boundary HB being the lower limit as illustrated. The point of maximum edge bulge on the trailing edge line HK(i+1) is identified with P4.

The blade edges are divided in respect of their qualitative shape into different edge types:

Edge type A: a substantially linear course, characterized in that a very small degree of bulge of WG<0.003 is provided.
Edge type B: a slightly curved course, characterized in that a small degree of bulge of 0.003<WG<0.01 is provided.
Edge type C: an at least partially curved course, without curvature change and with a degree of bulge of WG>0.01, where a section having a concave curvature towards the blade pressure side is provided.
Edge type D: an at least partially curved course, without curvature change and with a degree of bulge of WG>0.01, where a section having a convex curvature towards the blade pressure side is provided (mirror-inverted with the same quality as Type C).
Edge type E: an at least partially curved course, with a curvature change and with a degree of bulge of WG>0.01, where a section having a concave curvature towards the blade pressure side is provided between the curvature change point and the main flow path boundary HB.
Edge type F: an at least partially curved course, with a curvature change and with a degree of bulge of WG>0.01, where a section having a convex curvature towards the blade pressure side is provided between the curvature change point and the main flow path boundary HB (mirror-inverted with the same quality as type E).
Edge type G: an at least partially curved course, with two curvature changes and with a degree of bulge of WG>0.01, where a section having a concave curvature towards the blade pressure side is provided between the two curvature change points.
Edge type H: an at least partially curved course, with two curvature changes and with a degree of bulge of WG>0.01, where a section having a convex curvature towards the blade pressure side is provided between the two curvature change points (mirror-inverted with the same quality as type G).

A qualitative equality of two edges exists when they are either of the same type (also referred to as unidirectional qualitative equality) or when two edges are of different types, but are derived from one another in mirror-inverted form, e.g. types C and D, types E and F or types G and H (also referred to as counter-directional qualitative equality).

FIG. 5 shows an illustration of the blade edges in view B-B, representing the ideal case for viewing the blade edges, but stipulations in dimensionally differing views of the blade row pairing with its four edges within an angular range of +/−45° about the coordinate direction q can also be helpful as long as the latter is orthogonal to the coordinate direction or. It is particularly helpful here when the edges of the blade row group are viewed orthogonally to the coordinate directions s and or.

It is favourable in accordance with the invention when at least two of the four blade edges of the blade row pairing (i, i+1) have a qualitative equality in respect of their edge type. It can be advantageous here when a unidirectional qualitative equality is provided.

It can furthermore be advantageous for the blade row group when a qualitative equality is provided for at least three of the four blade edges of the blade row pairing (i, i+1). It can be advantageous here when a unidirectional qualitative equality is provided.

It can furthermore be advantageous for the blade row group when a qualitative equality is provided for all four blade edges of the blade row pairing (i, i+1). It can be advantageous here when a unidirectional qualitative equality is provided.

It can furthermore be advantageous for the blade row group when a qualitative equality is provided for the blade edges HK(i) and VK(i+1). It can be advantageous here when a unidirectional qualitative equality is provided. Alternatively it can be advantageous when a counter-directional qualitative equality is provided, i.e. the blade edges are derived from one another in mirror-inverted form.

It can furthermore be advantageous for the blade row group when a qualitative equality is provided for the blade edges VK(i) and VK(i+1). It can be advantageous here when a unidirectional qualitative equality is provided.

It can furthermore be advantageous for the blade row group when a qualitative equality is provided for the blade edges HK(i) and H(i+1). It can be advantageous here when a unidirectional qualitative equality is provided.

It can furthermore be advantageous for the blade row group when a qualitative equality is provided for the blade edges VK(i) and HK(i+1). It can be advantageous here when a unidirectional qualitative equality is provided. Alternatively it can be advantageous when a counter-directional qualitative equality is provided.

It can furthermore be advantageous when a qualitative equality of blade edges is provided in view B-B, perpendicular to the coordinate directions s and or. It can be advantageous here when a unidirectional qualitative equality is provided.

It is favourable when in view B-B at at least one of the edges VK(i) and VK(i+1) one of the edge types A, B, C, E and H is provided. It is advantageous here when one of the edge types C, E and H is provided. It is additionally advantageous here when an edge type C or alternatively an edge type E is provided. It is particularly advantageous here when at both edges VK(i) and VK(i+1) an edge type E is provided.

It is favourable when in view B-B at at least one of the edges VK(i) and VK(i+1) one of the edge types F and G is provided. It is advantageous here when an edge type F is provided. It is particularly advantageous here when at both edges VK(i) and VK(i+1) an edge type F is provided.

It is favourable when in view B-B at at least one of the edges HK(i) and HK(i+1) one of the edge types A, B, D, E and H is provided. It is advantageous here when one of the edge types B, D and E is provided. It is additionally advantageous here when an edge type D or alternatively an edge type E is provided. It is particularly advantageous here when at both edges HK(i) and HK(i+1) an edge type E is provided.

It is favourable when in view B-B at at least one of the edges HK(i) and HK(i+1) one of the edge types C, F and G is provided. It is advantageous here when one of the edge types C and F is provided. It is additionally advantageous here when an edge type C is provided. It is particularly advantageous here when at both edges HK(i) and HK(i+1) an edge type C is provided.

It is favourable when in view B-B at the edge VK(i+1) the edge type C and at the edge HK(i) one of the edge types A, B, C, D E and F is provided. It is advantageous here when at the edge HK(i) an edge type D or E is provided.

It is favourable when in view B-B at the edge VK(i+1) the edge type E and at the edge HK(i) one of the edge types A, B, C, D E and F is provided. It is advantageous here when at the edge HK(i) an edge type C or F is provided.

It is favourable when in view B-B at the edge VK(i+1) the edge type F and at the edge HK(i) one of the edge types A, B, C, D E and F is provided. It is advantageous here when at the edge HK(i) an edge type E or F is provided.

Besides the edge shape types described in the above text, for the edge types with at least one curvature change, the position of the curvature change plays a role in favourably influencing the flow in the area close to the main flow path boundary.

It is favourable when in view B-B the point of the curvature change of at least one of the blade edges VK(i), HK(i), VK(i+1) and HK(i+1) is provided in the area between the quarter meridional flow line SLQ and the main flow path boundary HB. It is advantageous here when the point of the curvature change is provided closer to SLQ than to HB.

It is favourable when in view B-B the point of the curvature change for at least the leading edges VK(i) and VK(i+1) or the trailing edges HK(i) and HK(i+1) is provided in the area between the quarter meridional flow line SLQ and the main flow path boundary HB. It is advantageous here when the point of the curvature change is provided closer to SLQ than to HB.

It is favourable when in view B-B the point of the curvature change of all blade edges VK(i), HK(i), VK(i+1) and HK(i+1) is provided in the area between the quarter meridional flow line SLQ and the main flow path boundary HB. It is advantageous here when the point of the curvature change is provided closer to SLQ than to HB.

It can furthermore be favourable when in view B-B the point of the curvature change of at least one of the blade edges VK(i), HK(i), VK(i+1) and HK(i+1) is provided closer to HB than to SLQ. It is advantageous here when this applies for at least one of the leading edges VK(i) and VK(i+1).

It can furthermore be favourable when in view B-B the point of the curvature change for at least the leading edges VK(i) and VK(i+1) or the trailing edges HK(i) and HK(i+1) is provided closer to HB than to SLQ. It is advantageous here when this applies for the leading edges VK(i) and VK(i+1).

It can furthermore be favourable when in view B-B the point of the curvature change of all blade edges VK(i), HK(i), VK(i+1) and HK(i+1) is provided closer to HB than to SLQ.

It can also be favourable with structural restrictions when in view B-B the point of the curvature change of at least one of the blade edges VK(i), HK(i), VK(i+1) and HK(i+1) is provided in the area between the quarter meridional flow line SLQ and the mean meridional flow line SLM. It is advantageous here when the point of the curvature change is provided closer to SLQ than to SLM.

It can furthermore be favourable with structural restrictions when in view B-B the point of the curvature change for at least the leading edges VK(i) and VK(i+1) or the trailing edges HK(i) and HK(i+1) is provided in the area between the quarter meridional flow line SLQ and the mean meridional flow line SLM. It is advantageous here when the point of the curvature change is provided closer to SLQ than to SLM.

It can furthermore be favourable with structural restrictions when in view B-B the point of the curvature change of all blade edges VK(i), HK(i), VK(i+1) and HK(i+1) is provided in the area between the quarter meridional flow line SLQ and the mean meridional flow line SLM. It is advantageous here when the point of the curvature change is provided closer to SLQ than to SLM.

Important for a particularly flow-oriented design of the blade edges are their tilt angles and the relationships to one another of the four tilt angles involved. In this connection, a blade half, as shown in FIG. 5, in the area between the mean meridional flow line SLM and the main flow path boundary HB is considered:

It is favourable in accordance with the present invention when at at least one of the two leading edges VK(i) and VK(i+1) a tilt angle (alpha1, alpha3) greater than zero is provided. It can be advantageous here when both tilt angles (alpha1, alpha3) are greater than zero. It can be particularly advantageous here when both tilt angles are provided with values in the range of 0°<alpha<20°.

It is furthermore favourable when at at least one of the two leading edges VK(i) and VK(i+1) a tilt angle (alpha1, alpha3) of less than zero is provided. It can be advantageous here when both tilt angles (alpha1, alpha3) are less than zero. It can be particularly advantageous here when both angles are provided with values in the range of −5°<alpha<0°.

It is furthermore favourable when at at least one of the two trailing edges HK(i) and HK(i+1) a tilt angle (alpha2, alpha4) of less than zero is provided. It can be advantageous here when both tilt angles (alpha2, alpha4) are less than zero. It can be particularly advantageous here when both tilt angles are provided with values in the range of −10°<alpha<0°.

It is furthermore favourable when at at least one of the two trailing edges HK(i) and HK(i+1) a tilt angle (alpha2, alpha4) greater than zero is provided. It can be advantageous here when both tilt angles (alpha2, alpha4) are greater than zero. It can be particularly advantageous here when both tilt angles are provided with values in the range of 0°<alpha<10°.

It is furthermore favourable when at at least three of the four edges VK(i), HK(i), VK(i+1) and HK(i+1) a tilt angle of less than zero is provided. It can be advantageous here when the leading edge VK(i) has a tilt angle alpha1 greater than zero. It can be particularly advantageous here when the tilt angle alpha1 is provided with values in the range of 0°<alpha1<10°.

It is furthermore favourable when at all four edges VK(i), HK(i), VK(i+1) and HK(i+1) a tilt angle of less than zero is provided.

It is furthermore favourable when at at least three of the four edges VK(i), HK(i), VK(i+1) and HK(i+1) a tilt angle greater than zero is provided. It can be advantageous here when the trailing edge HK(i+1) has a tilt angle alpha4 of less than zero. It can be particularly advantageous here when the tilt angle alpha4 is provided with values in the range of −5°<alpha4<0°.

It is furthermore advantageous when at all four edges VK(i), HK(i), VK(i+1) and HK(i+1) a tilt angle greater than zero is provided.

It can furthermore be advantageous when both tilt angles alpha1 and alpha3 are provided with values in the range of 0°<alpha<20°, and both tilt angles alpha2 and alpha4 with values in the range of −10°<alpha<0°. It can be particularly favourable here when the tilt angles alpha1 and alpha3 have equal values within a tolerance of 2°. It can additionally be favourable here when the tilt angles alpha2 and alpha4 have equal values within a tolerance of 2°. It can additionally be favourable here when the tilt angles alpha2 and alpha4 have low values, in accordance with −3°<alpha<0°. It can additionally be favourable here when the tilt angles alpha1 and alpha3 have high values, in accordance with 10°<alpha<20°.

It can furthermore be advantageous when both tilt angles alpha1 and alpha3 are provided with values in the range of −10°<alpha<0°, and both tilt angles alpha2 and alpha4 with values in the range of 0°<alpha<20°. It can be particularly favourable here when the tilt angles alpha1 and alpha3 have equal values within a tolerance of 2°. It can additionally be favourable here when the tilt angles alpha2 and alpha4 have equal values within a tolerance of 2°. It can additionally be favourable here when the tilt angles alpha1 and alpha3 have low values, in accordance with −3°<alpha<0°. It can additionally be favourable here when the tilt angles alpha2 and alpha4 have high values, in accordance with 10°<alpha<20°.

It is furthermore favourable when at VK(i+1) a larger tilt angle is provided than at VK(i), corresponding to alpha3>alpha1. It is furthermore favourable when at HK(i+1) a larger tilt angle is provided than at VK(i), corresponding to alpha4>alpha1. It is furthermore favourable when at HK(i+1) a larger tilt angle is provided than at HK(i), corresponding to alpha4>alpha2. It is furthermore favourable when at VK(i+1) a larger tilt angle is provided than at HK(i), corresponding to alpha3>alpha2.

It is furthermore favourable when at at least one of the two trailing edges HK(i) and HK(i+1) a tilt angle (alpha2, alpha4) greater than zero is provided, where alpha4 is greater than alpha2. It can be particularly advantageous here, when at HK(i+1) a larger tilt angle is provided than at VK(i), corresponding to alpha4>alpha1. It can additionally be advantageous here when at VK(i+1) a larger tilt angle is provided than at VK(i), corresponding to alpha3>alpha1. It can additionally be advantageous here when at VK(i) a tilt angle greater than zero is provided.

It is furthermore favourable when at at least two of the four blade edges VK(i), HK(i), VK(i+1) and HK(i+1) the tilt angles are provided equally large within a tolerance of 2°. It can be advantageous here when at at least three of the four blade edges VK(i), HK(i), VK(i+1) and HK(i+1) the tilt angles are provided equally large within a tolerance of 2°. It can be particularly advantageous here when at all four blade edges VK(i), HK(i), VK(i+1) and HK(i+1) the tilt angles are provided equally large within a tolerance of 2°.

It is furthermore favourable when at the blade edges VK(i) and HK(i) the tilt angles alpha1 and alpha2 are provided equally large within a tolerance of 2°. It is furthermore favourable when at the blade edges VK(i) and HK(i), within a tolerance of 2°, the tilt angles alpha1 and alpha2 are provided with the same values but with opposite sign.

It is furthermore favourable when at the blade edges VK(i+1) and HK(i+1) the tilt angles alpha3 and alpha4 are provided equally large within a tolerance of 2°. It is furthermore favourable when at the blade edges VK(i+1) and HK(i+1), within a tolerance of 2°, the tilt angles alpha3 and alpha4 are provided with the same values but with opposite sign.

It is furthermore favourable when at the blade edges HK(i) and VK(i+1) the tilt angles alpha2 and alpha3 are provided equally large within a tolerance of 2°. It is furthermore favourable when at the blade edges HK(i) and VK(i+1), within a tolerance of 2°, the tilt angles alpha2 and alpha3 are provided with the same values but with opposite sign.

It is furthermore favourable when at both edges VK(i) and HK(i+1) the tilt angles alpha1 and alpha4 are provided equally large within a tolerance of 2°. It is furthermore favourable when at the blade edges VK(i) and HK(i+1), within a tolerance of 2°, the tilt angles alpha1 and alpha4 are provided with the same values but with opposite sign.

It is furthermore favourable when the leading edge VK(i) is provided with a positive tilt angle alpha1>0 and the trailing edge HK(i+1) with a negative tilt angle alpha4<0.

It is furthermore favourable when the leading edge VK(i) is provided with a negative tilt angle alpha1<0 and the trailing edge HK(i+1) with a positive tilt angle alpha4>0.

It is furthermore favourable when the trailing edge HK(i) is provided with a negative tilt angle alpha2<0 and the leading edge VK(i+1) with a positive tilt angle alpha3>0.

It is furthermore favourable when the trailing edge HK(i) is provided with a positive tilt angle alpha2>0 and the leading edge VK(i+1) with a negative tilt angle alpha3<0.

It is furthermore favourable when the two edges HK(i) and VK(i+1) are provided with larger tilt angles than the two edges VK(i) and HK(i+1). It can be advantageous here when the tilt angles alpha1 and alpha4 of the edges VK(i) and HK(i+1) have low values, in accordance with −3°<alpha<3°. It can additionally be advantageous here when the tilt angle alpha1 is positive and the tilt angle alpha4 is negative.

It is furthermore favourable when the two edges HK(i) and VK(i+1) are provided with smaller tilt angles than the two edges VK(i) and HK(i+1). It can be advantageous here when the tilt angles alpha1 and alpha4 of the edges VK(i) and HK(i+1) have low values, in accordance with −3°<alpha<3°. It can additionally be advantageous here when the tilt angle alpha1 is positive and the tilt angle alpha4 is negative.

It is furthermore favourable when the tilt angles alpha1, alpha2 and alpha4 of the edges VK(i), HK(i) and HK(i+1) have low values, in accordance with −3°<alpha<3°. It can additionally be advantageous here when the tilt angle alpha1 is positive and the tilt angle alpha4 is negative. It can additionally be advantageous here when the tilt angle alpha3 is negative. It can additionally be advantageous here when the tilt angle alpha3 of the leading edge VK(i+1) is positive and provided with values in the range of 5°<alpha<20°.

For all considered embodiments of the blade row group in accordance with the invention, it can be advantageous when VK(i) has a larger tilt angle than all other blade edges.

Also important for a flow-oriented design of the blade edges are the degrees of bulge and the relationships to one another of the four degrees of bulge involved.

First, the degrees of bulge are classified in respect of their size, with four classes being formed:
Class 1: very small degree of bulge in accordance with 0<WG<0.003
Class 2: small degree of bulge in accordance with 0.003<WG<0.01
Class 3: medium degree of bulge in accordance with 0.01<WG<0.05
Class 4: high degree of bulge in accordance with 0.05<WG<0.2

It is favourable in accordance with the invention when a degree of bulge of one of the classes 2, 3 and 4 is provided at the leading edge VK(i). It is advantageous here when a degree of bulge of one of the classes 3 and 4 is provided at VK(i). It is additionally advantageous here when a degree of bulge of class 4 is provided at VK(i).

It is furthermore favourable when a degree of bulge of one of the classes 1, 2, 3 and 4 is provided at the leading edge VK(i+1). It is advantageous here when a degree of bulge of one of the classes 2, 3 and 4 is provided at VK(i+1). It is additionally advantageous here when a degree of bulge of one of the classes 3 and 4 is provided at VK(i+1). It is particularly advantageous here when a degree of bulge of class 4 is provided at VK(i+1).

It is furthermore favourable when a degree of bulge of one of the classes 1, 2 and 3 is provided at the trailing edge HK(i). It is advantageous here when a degree of bulge of one of the classes 1 and 2 is provided at HK(i). It is additionally advantageous here when a degree of bulge of class 2 is provided at HK(i).

It is furthermore favourable when a degree of bulge of one of the classes 1, 2 and 3 is provided at the trailing edge HK(i+1). It is advantageous here when a degree of bulge of one of the classes 1 and 2 is provided at HK(i+1). It is additionally advantageous here when a degree of bulge of class 2 is provided at HK(i+1).

It is furthermore favourable when a degree of bulge of one of the classes 3 and 4 is provided at the leading edge VK(i) and a degree of bulge of one of the classes 1 and 2 at the trailing edge HK(i+1). It is advantageous here when a degree of bulge of class 3 is provided at VK(i) and a degree of bulge of class 2 at HK(i+1). It is additionally advantageous here when a degree of bulge of class 3 is provided at the edges HK(i) and VK(i+1).

It is furthermore favourable when a degree of bulge of one of the classes 1 and 2 is provided at the leading edge VK(i) and at the trailing edge HK(i+1). It is advantageous here when a degree of bulge of class 2 is provided at VK(i) and at HK(i+1). It is additionally advantageous here when a degree of bulge of class 1 is provided at the edges HK(i) and VK(i+1).

It is furthermore favourable when a degree of bulge of one of the classes 3 and 4 is provided at the leading edge VK(i) and at the trailing edge HK(i+1). It is advantageous here when a degree of bulge of class 4 is provided at VK(i) and a degree of bulge of class 3 at HK(i+1). It is additionally advantageous here when a degree of bulge of class 3 is provided at the edges HK(i) and VK(i+1).

It is furthermore favourable when a degree of bulge of one of the classes 1 and 2 is provided at the leading edge VK(i) and a degree of bulge of one of the classes 3 and 4 at the trailing edge HK(i+1). It is advantageous here when a degree of bulge of class 2 is provided at VK(i) and a degree of bulge of class 3 at HK(i+1). It is additionally advantageous here when a degree of bulge of class 3 is provided at the edges HK(i) and VK(i+1).

It is furthermore favourable when at at least two of the edges VK(i), HK(i), VK(i+1) and HK(i+1) degrees of bulge of the same class are provided. It can be advantageous here when the degrees of bulge at at least two of the edges are provided equally large within a tolerance of 0.02.

It is furthermore favourable when at the edges VK(i) and HK(i) degrees of bulge of the same class are provided. It is advantageous here when at the edges VK(i+1) and HK(i+1) degrees of bulge of the same class are provided too.

It is furthermore favourable when at the edges VK(i+1) and HK(i+1) degrees of bulge of the same class are provided. It is advantageous here when at the edges VK(i) and HK(i) degrees of bulge of a different or of the same class are provided.

It is furthermore favourable when at the edges VK(i) and HK(i+1) degrees of bulge of the same class are provided. It is advantageous here when at the edges VK(i+1) and HK(i) degrees of bulge of a different or of the same class are provided.

It is furthermore favourable when at the edges VK(i+1) and HK(i) degrees of bulge of the same class are provided.

It is advantageous here when at the edges VK(i) and HK(i+1) degrees of bulge of a different or of the same class are provided.

It is furthermore favourable when at least three of the edges VK(i), HK(i), VK(i+1) and HK(i+1) degrees of bulge of the same class are provided. It can be advantageous here when the degrees of bulge at at least three of the edges are provided equally large within a tolerance of 0.02.

It is furthermore favourable when at all edges VK(i), HK(i), VK(i+1) and HK(i+1) degrees of bulge of the same class are provided. It can be advantageous here when the degrees of bulge at all edges are provided equally large within a tolerance of 0.02.

It is furthermore favourable when
at the edge VK(i) a degree of bulge of class 4,
at the edge HK(i) a degree of bulge of class 2,
at the edge VK(i+1) a degree of bulge of class 4, and
at the edge HK(i+1) a degree of bulge of class 1 is provided.

It is furthermore favourable when
at the edge VK(i) a degree of bulge of class 1,
at the edge HK(i) a degree of bulge of class 1,
at the edge VK(i+1) a degree of bulge of class 4, and
at the edge HK(i+1) a degree of bulge of class 1 is provided.

It is furthermore favourable when
at the edge VK(i) a degree of bulge of class 4,
at the edge HK(i) a degree of bulge of class 1,
at the edge VK(i+1) a degree of bulge of class 1, and
at the edge HK(i+1) a degree of bulge of class 1 is provided.

It is furthermore favourable when
at the edge VK(i) a degree of bulge of class 3,
at the edge HK(i) a degree of bulge of class 2,
at the edge VK(i+1) a degree of bulge of class 2, and
at the edge HK(i+1) a degree of bulge of class 1 is provided.

It is furthermore favourable when
at the edge VK(i) a degree of bulge of class 2,
at the edge HK(i) a degree of bulge of class 2,
at the edge VK(i+1) a degree of bulge of class 3, and
at the edge HK(i+1) a degree of bulge of class 2 is provided.

It is furthermore favourable when
at the edge VK(i) a degree of bulge of class 2,
at the edge HK(i) a degree of bulge of class 2,
at the edge VK(i+1) a degree of bulge of class 4, and
at the edge HK(i+1) a degree of bulge of class 2 is provided.

It is furthermore favourable when
at the edge VK(i) a degree of bulge of class 2,
at the edge HK(i) a degree of bulge of class 2,
at the edge VK(i+1) a degree of bulge of class 3, and
at the edge HK(i+1) a degree of bulge of class 1 is provided.

It is furthermore favourable when
at the edge VK(i) a degree of bulge of class 2,
at the edge HK(i) a degree of bulge of class 2,
at the edge VK(i+1) a degree of bulge of class 4, and
at the edge HK(i+1) a degree of bulge of class 1 is provided.

It is furthermore favourable when
at the edge VK(i) a degree of bulge of class 2,
at the edge HK(i) a degree of bulge of class 1,
at the edge VK(i+1) a degree of bulge of class 3, and
at the edge HK(i+1) a degree of bulge of class 3 is provided.

It is furthermore favourable when
at the edge VK(i) a degree of bulge of class 2,
at the edge HK(i) a degree of bulge of class 2,
at the edge VK(i+1) a degree of bulge of class 3, and
at the edge HK(i+1) a degree of bulge of class 3 is provided.

It is furthermore favourable when
at the edge VK(i) a degree of bulge of class 2,
at the edge HK(i) a degree of bulge of class 3,
at the edge VK(i+1) a degree of bulge of class 4, and at the edge HK(i+1) a degree of bulge of class 1 is provided.

Besides the quantities described in the above text for edge shape, tilt angle and degree of bulge, the positions of the maximum bulges (d1, d2, d3, d4) play a role in favourably influencing the flow in the area close to the main flow path boundary.

It is favourable when in view B-B the point of maximum bulge of at least one of the blade edges VK(i), HK(i), VK(i+1) and HK(i+1) is provided in the area between the quarter meridional flow line SLQ and the main flow path boundary HB. It is advantageous here when the point of maximum bulge is provided closer to SLQ than to HB.

It is favourable when in view B-B the point of maximum bulge for at least the leading edges VK(i) and VK(i+1) or the trailing edges HK(i) and HK(i+1) is provided in the area between the quarter meridional flow line SLQ and the main flow path boundary HB. It is advantageous here when the point of maximum bulge is provided closer to SLQ than to HB.

It is favourable when in view B-B the point of maximum bulge of all blade edges VK(i), HK(i), VK(i+1) and HK(i+1) is provided in the area between the quarter meridional flow line SLQ and the main flow path boundary HB. It is advantageous here when the point of maximum bulge is provided closer to SLQ than to HB.

It can furthermore be favourable when in view B-B the point of maximum bulge of at least one of the blade edges VK(i), HK(i), VK(i+1) and HK(i+1) is provided closer to HB than to SLQ. It is advantageous here when this applies for at least one of the leading edges VK(i) and VK(i+1).

It can furthermore be favourable when in view B-B the point of maximum bulge for at least the leading edges VK(i) and VK(i+1) or the trailing edges HK(i) and HK(i+1) is provided closer to HB than to SLQ. It is advantageous here when this applies for the leading edges VK(i) and VK(i+1).

It can furthermore be favourable when in view B-B the point of maximum bulge of all blade edges VK(i), HK(i), VK(i+1) and HK(i+1) is provided closer to HB than to SLQ.

It can also be favourable with structural restrictions when in view B-B the point of maximum bulge of at least one of the blade edges VK(i), HK(i), VK(i+1) and HK(i+1) is provided in the area between the quarter meridional flow line SLQ and the mean meridional flow line SLM. It is advantageous here when the point of maximum bulge is provided closer to SLQ than to SLM.

It can furthermore be favourable with structural restrictions when in view B-B the point of maximum bulge for at least the leading edges VK(i) and VK(i+1) or the trailing edges HK(i) and HK(i+1) is provided in the area between the quarter meridional flow line SLQ and the mean meridional flow line SLM. It is advantageous here when the point of maximum bulge is provided closer to SLQ than to SLM.

It can furthermore be favourable with structural restrictions when in view B-B the point of maximum bulge of all blade edges VK(i), HK(i), VK(i+1) and HK(i+1) is provided in the area between the quarter meridional flow line SLQ and the mean meridional flow line SLM. It is advantageous here when the point of maximum bulge is provided closer to the quarter meridional flow line SLQ than to the mean meridional flow line SLM.

Basic features of the blade row group in accordance with the invention have been stipulated in the above text. In the following, the invention is specified in greater detail on the basis of examples. FIG. 6a to FIG. 6e each show in the partial illustrations P1 to P20 the four blade edges VK(i), HK(i), VK(i+1) and HK(i+1) of two adjacent blades i and i+1, arranged one behind the other, of two blade rows in a blade row group in accordance with the invention in view B-B according to FIG. 4, in the area between the mean meridional flow line SLM and the main flow path boundary HB. The quarter meridional flow line SLQ is shown halfway between the mean meridional flow line SLM and the main flow path boundary HB in each case.

The partial illustration P1 shows the variant in accordance with the invention of a blade row group having the following features: at VK(i) an edge type E is provided, at HK(i) an edge type D, at VK(i+1) an edge type D and at HK(i+1) an edge type E. The edges HK(i) and VK(i+1) or VK(i) and HK(i+1) respectively are each of the same edge type. It can be advantageous here when the edge VK(i) has the point of the curvature change, as shown, in the area between SLQ and HB; in a special case, the point of the curvature change can be provided on SLQ. The edge HK(i) is arranged completely upstream of the edge VK(i+1); alternatively it is possible, unlike in the illustration, for the edge HK(i) to be arranged completely downstream of the edge VK(i+1). It is in any event advantageous when the edges HK(i) and VK(i+1) are substantially parallel (within a tolerance of 2° of the local angle of inclination). It can additionally be advantageous when the edges VK(i) and HK(i+1) steadily move away from each other in the area between SLQ and HB in the direction of HB. It can additionally be advantageous when all four blade edges locally on SLM include a substantially right angle with SLM (within a tolerance of 2°). It can additionally be advantageous when the trailing edge HK(i+1) locally at HB includes a substantially right angle with HB (within a tolerance of 2°).

The local angle of inclination of a blade edge on SLM or at HB is here always measured clockwise from the respective edge by the shortest route to SLM or to HB respectively (see partial illustration P1).

The partial illustration P2 shows the variant in accordance with the invention of a blade row group having the following features: at VK(i) an edge type B is provided, at HK(i) an edge type F, at VK(i+1) an edge type F and at HK(i+1) an edge type B. The edges HK(i) and VK(i+1) or VK(i) and HK(i+1) respectively are each of the same edge type. It can be advantageous here when the edges HK(i) and VK(i+1) have the point of the curvature change, as shown, in the area between SLQ and HB; in a special case, the point of the curvature change can be provided on SLQ. The edge HK(i) is arranged completely upstream of the edge VK(i+1); alternatively it is possible, unlike in the illustration, for the edge HK(i) to be arranged completely downstream of the edge VK(i+1). It is in any event advantageous when the edges HK(i) and VK(i+1) are substantially parallel (within a tolerance of 2° of the local angle of inclination). It can additionally be advantageous when the edges VK(i) and HK(i+1) are substantially parallel (within a tolerance of 2° of the local angle of inclination).

It can additionally be advantageous when all four blade edges locally on SLM include a substantially right angle with SLM (within a tolerance of 2°). It can additionally be advantageous when the trailing edge HK(i+1) locally at HB includes a substantially right angle with HB (within a tolerance of 2°). It can additionally be advantageous when all four blade edges locally on SLM include a substantially right angle with SLM (within a tolerance of 2°). It can additionally be advantageous when all four blade edges locally at HB include a substantially right angle with HB (within a tolerance of 2°).

The partial illustration P3 shows the variant in accordance with the invention of a blade row group having the following features: at VK(i) an edge type A is provided, at HK(i) an edge type F, at VK(i+1) an edge type F and at HK(i+1) an edge type A. The edges HK(i) and VK(i+1) or VK(i) and HK(i+1) respectively are each of the same edge type. It can be advantageous here when the edges HK(i) and VK(i+1) have the point of the curvature change, as shown, in the area between SLQ and HB; in a special case, the point of the curvature change can be provided on SLQ. The edge HK(i) is arranged completely downstream of the edge VK(i+1); alternatively it is possible, unlike in the illustration, for the edge HK(i) to be arranged completely upstream of the edge VK(i+1). It is in any event advantageous when the edges HK(i) and VK(i+1) are substantially parallel (within a tolerance of 2° of the local angle of inclination).

It can additionally be advantageous when the edges VK(i) and HK(i+1) are substantially parallel (within a tolerance of 2° of the local angle of inclination). It can additionally be advantageous when all four blade edges locally on SLM include a substantially right angle with SLM (within a tolerance of 2°). It can additionally be advantageous when the trailing edge HK(i+1) locally at HB includes a substantially right angle with HB (within a tolerance of 2°). It can additionally be advantageous when all four blade edges locally at HB include a substantially right angle with HB (within a tolerance of 2°).

The partial illustration P4 shows the variant in accordance with the invention of a blade row group having the following features: at VK(i) an edge type F is provided, at HK(i) an edge type F, at VK(i+1) an edge type F and at HK(i+1) an edge type A. The edges VK(i), HK(i) and VK(i+1) are of the same edge type. It can be advantageous here when the edges VK(i), HK(i) and VK(i+1) have the point of the curvature change, as shown, in the area between SLQ and HB; in a special case, the point of the curvature change can be provided on SLQ. The edge HK(i) intersects the edge VK(i+1) and is arranged in an area adjoining HB downstream of VK(i+1). It can be advantageous here when the intersection point of the edges HK(i) and VK(i+1) is provided in the area between SLQ and HB; alternatively, it can be advantageous with structural restrictions when the intersection point (unlike as shown) is provided in the area between SLM and SLQ or even on SLQ.

It can additionally be advantageous when the edges VK(i) and HK(i) are substantially parallel (within a tolerance of 2° of the local angle of inclination). It can additionally be advantageous when all four blade edges locally on SLM include a substantially right angle with SLM (within a tolerance of 2°). It can additionally be advantageous when the trailing edge HK(i+1) locally at HB includes a substantially right angle with HB (within a tolerance of 2°). It can additionally be advantageous when all four blade edges locally at HB include a substantially right angle with HB (within a tolerance of 2°).

The partial illustration P5 of FIG. 6b shows the variant in accordance with the invention of a blade row group having the following features: at VK(i) an edge type C is provided, at HK(i) an edge type C, at VK(i+1) an edge type C and at HK(i+1) an edge type B. The edges VK(i), HK(i) and VK(i+1) are of the same edge type. It can be advantageous here when the edges VK(i), HK(i) and VK(i+1) have the point of maximum bulge in the area between SLQ and HB; in a special case, the point of maximum bulge can be provided on SLQ. The edge HK(i) is arranged at least partially (or as shown here completely) upstream of the edge VK(i+1); alternatively it is possible, unlike in the illustration, for the edge HK(i) to be arranged completely downstream of the edge VK(i+1). It is in any event advantageous when the edges HK(i) and VK(i+1) are substantially parallel (within a tolerance of 2° of the local angle of inclination). It can additionally be advantageous when the edges VK(i) and HK(i+1) steadily move away from each other in the area between SLQ and HB in the direction of HB. It can additionally be advantageous when all four blade edges locally on SLM include a substantially right angle with SLM (within a tolerance of 2°). It can additionally be advantageous when the trailing edge HK(i+1) locally at HB includes a substantially right angle with HB (within a tolerance of 2°).

It can additionally be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P6 shows the variant in accordance with the invention of a blade row group having the following features: at VK(i) an edge type C is provided, at HK(i) an edge type C, at VK(i+1) an edge type C and at HK(i+1) an edge type C. The edges VK(i), HK(i), VK(i+1) and HK(i+1) are of the same edge type. It can be advantageous here when all edges have the point of maximum bulge in the area between SLQ and HB; in a special case, the point of maximum bulge can be provided on SLQ. The edge HK(i) is arranged at least partially (or as shown here completely) downstream of the edge VK(i+1); alternatively it is possible, unlike in the illustration, for the edge HK(i) to be arranged completely upstream of the edge VK(i+1). It is in any event advantageous when the edges HK(i) and VK(i+1) are substantially parallel (within a tolerance of 2° of the local angle of inclination). It can additionally be advantageous when the edges VK(i) and HK(i+1) are substantially parallel (within a tolerance of 2° of the local angle of inclination).

It can additionally be advantageous when all four blade edges locally on SLM include a substantially right angle with SLM (within a tolerance of 2°). It can additionally be advantageous when an acute angle of less than 75° is provided at all four blade edges locally at HB between HB and the respective edge. It can additionally be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P7 shows the variant in accordance with the invention of a blade row group having the following features: at VK(i) an edge type C is provided, at HK(i) an edge type C and at VK(i+1) an edge type C. The edges VK(i), HK(i) and VK(i+1) are of the same edge type. It can be advantageous here when these edges have the point of maximum bulge in the area between SLQ and HB; in a special case, the point of maximum bulge can be provided on SLQ. The edge HK(i) is arranged at least partially (or as shown here completely) downstream of the edge VK(i+1). It is advantageous when the edges HK(i) and VK(i+1) move away from each other in the area between SLQ and HB in the direction of HB, and when VK(i+1) locally at HB includes a more acute angle with HB than does HK(i).

It can additionally be advantageous when an edge type C is provided at HK(i+1) too. It can additionally be advantageous here when the edges HK(i) and HK(i+1) approach each other in the area between SLQ and HB in the direction of HB. It can additionally be advantageous when the edges VK(i) and HK(i+1) approach each other in the area between SLQ and HB in the direction of HB. It can additionally be advantageous when all four blade edges locally on SLM include a substantially right angle with SLM (within a tolerance of 2°). It can additionally be advantageous when an acute angle of less than 75° is provided at all four blade edges locally at HB between HB and the respective edge. It can additionally be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P8 shows the variant in accordance with the invention of a blade row group having the following features: at VK(i) an edge type E is provided, at HK(i) an edge type E and at VK(i+1) an edge type C. The edges VK(i) and HK(i) are of the same edge type. It can be advantageous here when these edges have the point of the curvature change in the area between SLQ and HB; in a special case, the point of the curvature change can be provided on SLQ. The edge HK(i) is arranged at least partially downstream of the edge VK(i+1). It is advantageous when the edges HK(i) and VK(i+1) move away from each other in an area adjoining HB in the direction of HB, and when VK(i+1) locally at HB includes a more acute angle with HB than does HK(i).

It can additionally be advantageous when an edge type C is provided at HK(i+1) too. It can additionally be advantageous here when the edges HK(i) and HK(i+1) approach each other in the area between SLQ and HB in the direction of HB and when HK(i+1) locally at HB includes a more acute angle with HB than does HK(i). It can additionally be advantageous when the edges VK(i) and HK(i+1) approach each other in the area between SLQ and HB in the direction of HB. It can additionally be advantageous when all four blade edges locally on SLM include a substantially right angle with SLM (within a tolerance of 2°). It can additionally be advantageous when an acute angle of less than 75° is provided at all four blade edges locally at HB between HB and the respective edge. It can additionally be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P9 of FIG. 6c shows the variant in accordance with the invention of a blade row group having the following features: at VK(i) an edge type B is provided, at HK(i) an edge type B, at VK(i+1) an edge type C and at HK(i+1) an edge type B. The edges VK(i), HK(i) and HK(i+1) are of the same edge type. It can be advantageous here when the edge VK(i+1) has the point of maximum bulge in the area between SLQ and HB; in a special case, the point of maximum bulge can be provided on SLQ. The edge HK(i) is arranged at least partially downstream of the edge VK(i+1). It is advantageous when the edges HK(i) and VK(i+1) move away from each other in an area adjoining HB in the direction of HB and when the edge VK(i+1) locally at HB includes a more acute angle with HB than does HK(i). It can additionally be advantageous here when the edges VK(i) and VK(i+1) approach each other in the area between SLQ and HB in the direction of HB and when the edge VK(i+1) locally at HB includes a more acute angle with HB than does VK(i).

It can additionally be advantageous when the edges VK(i) and HK(i) approach each other in an area adjoining HB in the direction of HB. It can additionally be advantageous when all four blade edges locally on SLM include a substantially right angle with SLM (within a tolerance of 2°). It can additionally be advantageous when an acute angle of less than 75° is provided locally at HB only between the edge VK(i+1) and HB. It can additionally be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P10 shows the variant in accordance with the invention of a blade row group having the following features: the front and the rear blades have the same edge types in mirror-inverted form, in the present case such that at VK(i) an edge type B is provided, at HK(i) an edge type D, at VK(i+1) an edge type C and at HK(i+1) an edge type B. The edges VK(i) and HK(i+1) are of the same edge type. It can be advantageous here when the edges HK(i) and VK(i+1) have the point of maximum bulge in the area between SLQ and HB; in a special case, the point of maximum bulge can be provided on SLQ. The edge HK(i) is arranged at least partially downstream of the edge VK(i+1).

It is advantageous when the edges HK(i) and VK(i+1) move away from each other in an area adjoining HB in the direction of HB and when the edge VK(i+1) locally at HB includes a more acute angle with HB, while HK(i) includes an obtuse angle. It can additionally be advantageous here when the edges VK(i) and VK(i+1) approach each other in the area between SLQ and HB in the direction of HB and when the edge VK(i+1) locally at HB includes a more acute angle with HB than does VK(i). It can additionally be advantageous when the edges HK(i) and HK(i+1) approach each other in an area adjoining HB in the direction of HB and when the edge HK(i) locally at HB includes a more obtuse angle with HB than does HK(i+1). It can additionally be advantageous when all four blade edges locally on SLM include a substantially right angle with SLM (within a tolerance of 2°).

It can additionally be advantageous when an acute angle of less than 75° is provided locally at HB between the edge VK(i+1) and HB, and an obtuse angle greater than 105° is provided between the edge HK(i) and HB. It can additionally be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P11 shows the variant in accordance with the invention of a blade row group having the following features: the front and the rear blades have the same edge types in mirror-inverted form, in the present case such that at VK(i) an edge type C is provided, at HK(i) an edge type E, at VK(i+1) an edge type F and at HK(i+1) an edge type D. The edges VK(i) and HK(i+1) are of the same edge type in mirror-inverted form. It can be advantageous here when the edges VK(i) and HK(i+1) have the point of maximum bulge in the area between SLQ and HB; in a special case, the point of maximum bulge can be provided on SLQ. The edges HK(i) and VK(i+1) are of the same edge type in mirror-inverted form. It can be advantageous here when the edges VK(i) and HK(i+1) have the point of the curvature change in the area between SLQ and HB; in a special case, the point of the curvature change can be provided on SLQ. The edge HK(i) is arranged at least partially downstream of the edge VK(i+1).

It is advantageous when the edges HK(i) and VK(i+1) move away from each other in an area adjoining HB in the direction of HB. It can additionally be advantageous here when the edges VK(i) and VK(i+1) approach each other in the area between SLQ and HB in the direction of HB. It can additionally be advantageous when the edges HK(i) and HK(i+1) approach each other in an area adjoining HB in the direction of HB. It can additionally be advantageous when all four blade edges locally on SLM include a substantially right angle with SLM (within a tolerance of 2°). It can additionally be advantageous when an acute angle is provided locally at HB between the edge VK(i+1) and HB, and an obtuse angle is provided between the edge HK(i) and HB. It can additionally be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P12 shows the variant in accordance with the invention of a blade row group having the following features: the front and the rear blades have the same edge types in mirror-inverted form, in the present case such that at VK(i) an edge type C is provided, at HK(i) an edge type D, at VK(i+1) an edge type C and at HK(i+1) an edge type D. The edges VK(i) and HK(i+1) are of the same edge type in mirror-inverted form. The edges HK(i) and VK(i+1) are of the same edge type in mirror-inverted form. It can be advantageous here when the edges have the point of maximum bulge in the area between SLQ and HB; in a special case, the point of maximum bulge can be provided on SLQ. The edge HK(i) is arranged at least partially downstream of the edge VK(i+1) (or as shown here, even completely downstream of VK(i+1)).

It is advantageous when the edges HK(i) and VK(i+1) move away from each other in an area adjoining HB in the direction of HB. It can additionally be advantageous here when the edges VK(i) and VK(i+1) approach each other in the area between SLQ and HB in the direction of HB. It can additionally be advantageous when the edges HK(i) and HK(i+1) approach each other in an area adjoining HB in the direction of HB. It can additionally be advantageous when all four blade edges locally on SLM include a substantially right angle with SLM (within a tolerance of 2°). It can additionally be advantageous when an acute angle is provided locally at HB between the edge VK(i+1) and HB, and an obtuse angle is provided between the edge HK(i) and HB. It can additionally be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P13 of the FIG. 6d shows the variant in accordance with the invention of a blade row group having the following features: the front and the rear blades have the same edge types, in the present case such that at VK(i) an edge type C is provided, at HK(i) an edge type B, at VK(i+1) an edge type C and at HK(i+1) an edge type B. The edges VK(i) and VK(i+1) are of the same edge type. It can be advantageous here when the edges VK(i) and VK(i+1) have the point of maximum bulge in the area between SLQ and HB; in a special case, the point of maximum bulge can be provided on SLQ. The edges HK(i) and HK(i+1) are of the same edge type. The edge HK(i) is arranged at least partially downstream of the edge VK(i+1) (or as not shown here, even completely downstream of VK(i+1)).

It can be advantageous when the edges VK(i) and VK(i+1) are substantially parallel (within a tolerance of 2° of the local angle of inclination). It can additionally be advantageous when the edges HK(i) and HK(i+1) are substantially parallel (within a tolerance of 2° of the local angle of inclination). It can additionally be advantageous when all four blade edges locally on SLM include a substantially right angle with SLM (within a tolerance of 2°). It can additionally be advantageous when an acute angle of less than 75° is provided locally at HB between the edge VK(i) and HB, and an acute angle of less than 75° is provided between the edge VK(i+1) and HB. It can additionally be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P14 shows the variant in accordance with the invention of a blade row group having the following features: the front and the rear blades have the same edge types, in the present case such that at VK(i) an edge type F is provided, at HK(i) an edge type C, at VK(i+1) an edge type F and at HK(i+1) an edge type C. The edges VK(i) and VK(i+1) are of the same edge type. It can be advantageous here when the edges VK(i) and VK(i+1) have the point of the curvature change in the area between SLQ and HB; in a special case, the point of the curvature change can be provided on SLQ. The edges HK(i) and HK(i+1) are of the same edge type.

It can be advantageous here when the edges HK(i) and HK(i+1) have the point of maximum bulge in the area between SLQ and HB; in a special case, the point of maximum bulge can be provided on SLQ. The edge HK(i) is arranged at least partially downstream of the edge VK(i+1) (or as shown here, completely downstream of VK(i+1). It can be advantageous when the edges HK(i) and VK(i+1) move away from each other in an area adjoining HB in the direction of HB. It can be advantageous when the edges VK(i) and VK(i+1) are substantially parallel (within a tolerance of 2° of the local angle of inclination). It can additionally be advantageous when the edges HK(i) and HK(i+1) are substantially parallel (within a tolerance of 2° of the local angle of inclination). It can additionally be advantageous when all four blade edges locally on SLM include a substantially right angle with SLM (within a tolerance of 2°).

It can additionally be advantageous when an acute angle of less than 75° is provided locally at HB between the edge HK(i) and HB, and an acute angle of less than 75° is provided between the edge HK(i+1) and HB. It can additionally be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P15 shows the variant in accordance with the invention of a blade row group having the following features: the front and the rear blades have the same edge types, in the present case such that at VK(i) an edge type F is provided, at HK(i) an edge type E, at VK(i+1) an edge type F and at HK(i+1) an edge type E. The edges VK(i) and VK(i+1) are of the same edge type. It can be advantageous here when the edges VK(i) and VK(i+1) have the point of the curvature change in the area between SLQ and HB; in a special case, the point of the curvature change can be provided on SLQ. The edges HK(i) and HK(i+1) are of the same edge type.

It can be advantageous here when the edges HK(i) and HK(i+1) have the point of the curvature change in the area between SLQ and HB; in a special case, the point of the curvature change can be provided on SLQ. The edge HK(i) is arranged at least partially upstream of the edge VK(i+1) (or as shown here, completely upstream of VK(i+1)). It can be advantageous when the edges VK(i) and VK(i+1) are substantially parallel (within a tolerance of 2° of the local angle of inclination). It can additionally be advantageous when the edges HK(i) and HK(i+1) are substantially parallel (within a tolerance of 2° of the local angle of inclination). It can additionally be advantageous when all four blade edges locally on SLM include a substantially right angle with SLM (within a tolerance of 2°).

It can additionally be advantageous when locally at HB an acute angle of less than 75° is provided between the edge VK(i) and HB and an acute angle of less than 75° is provided between the edge VK(i+1) and HB. It can however also be advantageous when in an area adjoining HB the edge HK(i) is provided downstream of the edge VK(i+1). It can furthermore be advantageous here when the edges HK(i) and VK(i+1) form an intersection point. It is advantageous when the intersection point is provided in the area between SLQ and HB, ideally closer to SLQ.

The partial illustration P16 shows the variant in accordance with the invention of a blade row group having the following features: the front and the rear blades have the same edge types, in the present case such that at VK(i) an edge type E is provided, at HK(i) an edge type E, at VK(i+1) an edge type E and at HK(i+1) an edge type E. The edges VK(i), HK(i), VK(i+1) and HK(i+1) are of the same edge type. It can be advantageous here when the edges have the point of the curvature change in the area between SLQ and HB; in a special case, the point of the curvature change can be provided on SLQ. The edge HK(i) is arranged at least partially downstream of the edge VK(i+1) (or as shown here, completely downstream of VK(i+1)).

It can be advantageous when the edges HK(i) and VK(i+1) move away from each other in an area adjoining HB in the direction of HB. It can be advantageous when the edges VK(i) and VK(i+1) are substantially parallel (within a tolerance of 2° of the local angle of inclination). It can additionally be advantageous when the edges HK(i) and HK(i+1) are substantially parallel (within a tolerance of 2° of the local angle of inclination). It can additionally be advantageous when all four blade edges locally on SLM include a substantially right angle with SLM (within a tolerance of 2°).

It can additionally be advantageous when an acute angle of less than 75° is provided locally at HB between the edge VK(i) and HB, and an acute angle of less than 75° is provided between the edge VK(i+1) and HB. It can additionally be advantageous when an angle between 75° and 105° is provided locally at HB between the edge HK(i) and HB, and an angle between 75° and 105° is provided between the edge HK(i+1) and HB. It can also be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P17 of FIG. 6e shows the variant in accordance with the invention of a blade row group having the following features: three edges have the same edge type, in the present case such that at VK(i) an edge type C is provided, at HK(i) an edge type B, at VK(i+1) an edge type B and at HK(i+1) an edge type B. It can be advantageous when at HK(i) an edge type A is provided, at VK(i+1) an edge type A and at HK(i+1) an edge type A. The edges HK(i), VK(i+1) and HK(i+1) are of the same edge type. It can be advantageous here when the edge VK(i) has the point of maximum bulge in the area between SLQ and HB; in a special case, the point of maximum bulge can be provided on SLQ.

The edge HK(i) is arranged at least partially downstream of the edge VK(i+1) (or as shown here, completely downstream of VK(i+1)). It can be advantageous when the edges HK(i) and VK(i+1) move away from each other in an area adjoining HB in the direction of HB. It can be advantageous when the edges VK(i) and VK(i+1) move away from each other in an area adjoining HB in the direction of HB. It can additionally be advantageous when the edges VK(i+1) and HK(i+1) are substantially parallel (within a tolerance of 2° of the local angle of inclination). It can additionally be advantageous when the edges HK(i) and HK(i+1) are substantially parallel (within a tolerance of 2° of the local angle of inclination).

It can additionally be advantageous when all four blade edges locally on SLM include a substantially right angle with SLM (within a tolerance of 2°). It can additionally be advantageous when an acute angle of less than 75° is provided locally at HB between the edge VK(i) and HB. It can additionally be advantageous when an angle between 75° and 105° is provided locally at HB between the edge HK(i) and HB, and an angle between 75° and 105° is provided between the edge HK(i+1) and HB. It can additionally be advantageous when the edges HK(i) and HK(i+1) locally at HB include a substantially right angle with HB (within a tolerance of 2°). It can additionally be advantageous when the edge VK(i+1) locally at HB includes a substantially right angle with HB (within a tolerance of 2°). It can also be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P18 shows the variant in accordance with the invention of a blade row group having the following features: all edges have the same edge type, in the present case such that at VK(i) an edge type C is provided, at HK(i) an edge type C, at VK(i+1) an edge type C and at HK(i+1) an edge type C. It can be advantageous here when the edge VK(i) has the point of maximum bulge in the area between SLQ and HB; in a special case, the point of maximum bulge can be provided on SLQ. It can be advantageous here when for the edges HK(i), VK(i+1) and HK(i+1) the point of maximum bulge is provided closer to SLQ than to HB or SLM; in a special case, the point of maximum bulge can be provided on SLQ. The edge HK(i) is arranged at least partially downstream of the edge VK(i+1) (or as shown here, completely downstream of VK(i+1)).

It can be advantageous when the edges HK(i) and VK(i+1) move away from each other in an area adjoining HB in the direction of HB. It can be advantageous when the edges VK(i) and VK(i+1) move away from each other in an area adjoining HB in the direction of HB. It can additionally be advantageous when the edges VK(i+1) and HK(i+1) are substantially parallel (within a tolerance of 2° of the local angle of inclination). It can additionally be advantageous when the edges HK(i) and HK(i+1) are substantially parallel (within a tolerance of 2° of the local angle of inclination). It can additionally be advantageous when all four blade edges locally on SLM include a substantially right angle with SLM (within a tolerance of 2°).

It can additionally be advantageous when an acute angle of less than 75° is provided locally at HB between the edge VK(i) and HB. It can additionally be advantageous when an angle between 75° and 105° is provided locally at HB between the edge HK(i) and HB, and an angle between 75° and 105° is provided between the edge HK(i+1) and HB. It can additionally be advantageous when the edges HK(i) and HK(i+1) locally at HB include a substantially right angle with HB (within a tolerance of 2°). It can additionally be advantageous when the edge VK(i+1) locally at HB includes a substantially right angle with HB (within a tolerance of 2°). It can also be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P19 shows the variant in accordance with the invention of a blade row group having the following features: at least two edges have the same edge type, in the present case such that at VK(i) an edge type C is provided, at HK(i) an edge type D, at VK(i+1) an edge type E and at HK(i+1) an edge type D. The trailing edges are of the same edge type. It can be advantageous when the edge VK(i) has the point of maximum bulge in the area between SLQ and HB; in a special case, the point of maximum bulge can be provided on SLQ.

It can however also be advantageous when an edge type C is provided at the edge VK(i+1) such that in each case the leading edges and the trailing edges are of the same edge type. It can be advantageous here when the edge VK(i+1) has the point of maximum bulge in the area between SLQ and HB; in a special case, the point of maximum bulge can be provided on SLQ. It can additionally be advantageous when for the edges HK(i) and HK(i+1) the point of maximum bulge is provided closer to SLQ than to HB or SLM; in a special case, the point of maximum bulge can be provided on SLQ. The edge HK(i) is arranged at least partially downstream of the edge VK(i+1) (or as shown here, completely downstream of VK(i+1)).

It can be advantageous when the edges HK(i) and VK(i+1) move away from each other in an area adjoining HB in the direction of HB. It can be advantageous when the edges VK(i+1) and HK(i+1) move away from each other in an area adjoining HB in the direction of HB. It can be advantageous when the edges HK(i) and HK(i+1) are substantially parallel (within a tolerance of 2° of the local angle of inclination). It can additionally be advantageous when at least two of the four blade edges locally on SLM include an acute angle of less than 85° with SLM. It can be favourable here when at least two of the four blade edges locally on SLM include an acute angle between 65° and 80° with SLM. It can additionally be advantageous when all four blade edges locally on SLM include an acute angle of less than 85° with SLM. It can be favourable here when all four blade edges locally on SLM include an acute angle between 65° and 80° with SLM.

It can additionally be advantageous when an acute angle of less than 75° is provided locally at HB between the edge VK(i) and HB. It can additionally be advantageous when an angle between 75° and 105° is provided locally at HB between the edge HK(i) and HB, and an angle between 75° and 105° is provided between the edge HK(i+1) and HB. It can additionally be advantageous when the edges HK(i) and HK(i+1) locally at HB include a substantially right angle with HB (within a tolerance of 2°). It can additionally be advantageous when the edge VK(i+1) locally at HB includes an angle of less than 75° with HB. It can also be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

The partial illustration P20 shows the variant in accordance with the invention of a blade row group having the following features: at least two edges have the same edge type, in the present case such that at VK(i) an edge type C is provided, at HK(i) an edge type A, at VK(i+1) an edge type C and at HK(i+1) an edge type A. The trailing edges are of the same edge type. The leading edges are of the same edge type. It can be advantageous when the edges VK(i) and VK(i+1) have the point of maximum bulge in the area between SLQ and HB; in a special case, the point of maximum bulge can be provided on SLQ.

It can however also be advantageous when an edge type C is provided at the edges HK(i) and HK(i+1) such that the leading and the trailing edges are of the same edge type. It can be advantageous here when the edges HK(i) and HK(i+1) have the point of maximum bulge in the area between SLQ and HB. It can additionally be advantageous when for the edges HK(i) and HK(i+1) the point of maximum bulge is provided closer to SLQ than to HB or SLM; in a special case, the point of maximum bulge can be provided on SLQ. The edge HK(i) is arranged at least partially downstream of the edge VK(i+1) (or as shown here, completely downstream of VK(i+1)).

It can be advantageous when the edges HK(i) and VK(i+1) move away from each other in an area adjoining HB in the direction of HB. It can be advantageous when the edges VK(i+1) and HK(i+1) move away from each other in an area adjoining HB in the direction of HB. It can be advantageous when the edges VK(i) and HK(i) move away from each other in an area adjoining HB in the direction of HB. It can additionally be advantageous when the edges VK(i) and VK(i+1) are substantially parallel (within a tolerance of 2° of the local angle of inclination). It can additionally be advantageous when the edges HK(i) and HK(i+1) are substantially parallel (within a tolerance of 2° of the local angle of inclination). It can additionally be advantageous when at least two of the four blade edges locally on SLM include an obtuse angle greater than 95° with SLM.

It can be favourable here when at least two of the four blade edges locally on SLM include an obtuse angle between 100° and 115° with SLM. It can additionally be advantageous when all four blade edges locally on SLM include an obtuse angle greater than 95° with SLM. It can be favourable here when all four blade edges locally on SLM include an obtuse angle between 100° and 115° with SLM. It can additionally be advantageous when an acute angle of less than 75° is provided locally at HB between the edge VK(i) and HB.

It can additionally be advantageous when an acute angle of less than 75° is provided locally at HB between the edge VK(i+1) and HB. It can additionally be advantageous when an angle between 75° and 105° is provided locally at HB between the edge HK(i) and HB, and an angle between 75° and 105° is provided between the edge HK(i+1) and HB. It can additionally be advantageous when the edges HK(i) and HK(i+1) locally at HB include a substantially right angle with HB (within a tolerance of 2°). It can also be advantageous when in an area adjoining SLM the edge HK(i) is provided upstream of the edge VK(i+1) and these two edges form an intersection point. It is advantageous when the intersection point is provided in the area between SLQ and HB, ideally closer to SLQ.

It can furthermore be advantageous when in at least one area of the blade height adjoining one of the main flow path boundaries (hub and casing) between the front section of the suction side of a blade in a member blade row (i+1) and the rear section of the pressure side of a blade in a member blade row (i) a secondary passage is provided that guides the flow locally and favourably matches the interference behaviour of the member blade rows (i) and (i+1) along the blade height.

The present figure description describes the position and shape or the course of blade edges between the mean meridional flow line (SLM) and one of the main flow path boundaries (HB). To the other of the two main flow path boundaries, it is possible starting from the mean meridional flow line (SLM) to achieve an appropriate position and shape or an appropriate course of the blade edges, where—relative to the mean meridional flow line (SLM)—both symmetrical and asymmetrical courses of the blade edges can be achieved.

An advantageous flow behaviour in a blade group in accordance with the invention can therefore result when in the area of the blade ends at the hub and casing adjoining the respective main flow path boundary, in each case at least one of the features described in the above text is provided. It can be provided here that in the area of the hub and of the casing at least one identical feature or even completely identical features are provided.

What is claimed is:

1. A blade row group arrangeable in a main flow path of a fluid-flow machine, comprising:
    a number N of adjacent member blade rows arranged relative to one another in both a meridional direction (m) and a circumferential direction (u), with the number N of the adjacent member blade rows being greater than or equal to 2 and (i) designating a running index with values between 1 and N, with a front member blade row with front blades (i) having a leading edge VK(i) and a trailing edge HK(i) as well as a rear member blade row with rear blades (i+1) having a leading edge VK(i+1) and a trailing edge HK(i+1) being provided,
    where the blade row group has two main flow path boundaries (HB),
    where the leading edge VK(i+1) of at least one blade (i+1) of the rear member blade row is provided in a vicinity of a blade (i) of the front member blade row,
    where leading edges VK(i) and VK(i+1) and trailing edges HK(i) and HK(i+1) of the member blade rows of the blade row group are viewed between one of the two main flow path boundaries (HB) and a mean meridional flow line (SLM) in the main flow path center,
    wherein, a plane is taken at a meridional flow line section established by the meridional direction (m) and by the circumferential coordinate (u), and when viewing the blade row group in the plane, a chord Se(i) of the front blade is defined as a tangent lying on a profile of the front blade (i) on a pressure side and a chord Se(i+1) of the rear blade is defined as a tangent lying on a profile of the rear blade (i+1) on a pressure side,
    where a stagger angle of the front blade lambda(i) and a stagger angle of the rear blade lambda(i+1) are defined as angles of inclination of the respective chord relative to the meridional direction (m),
    where a mean stagger angle lambdam is defined as a mean value of the stagger angles lambda(i) and lambda(i+1), in accordance with lambdam=(lambda(i)+lambda(i+1))/2,
    where an auxiliary coordinate system having a first, a second and a third coordinate direction (s, q, or) is provided, with the first coordinate direction (s) facing downstream at the angle lambdam relative to the meridional direction (m), the second coordinate direction (q), perpendicular to the first coordinate direction (s), facing away from the pressure side of the front blade (i), and the third coordinate direction (or) being perpendicular to the first coordinate direction (s) and to the second coordinate direction (q),
    where a degree of bulge WG of the leading edges VK(i) and VK(i+1) and the trailing edges HK(i) and HK(i+1) is defined as a greatest ascertainable distance (d) between a respective blade edge and a straight connection of blade edge points on the mean meridional flow line (SLM) and one of the two main flow path boundaries (HB) relative to a width (dor) measured perpendicular to the first coordinate direction (s) at the blade edge between the mean meridional flow line (SLM) and the one of the two main flow path boundaries (HB),
    where the four blade edges VK(i), HK(i), VK(i+1) and HK(i+1) are each associated with one edge type of a plurality of edge types that are defined by a curvature of an edge contour, a number of curvature changes, and the degree of bulge,
    where a qualitative equality is defined as at least two blade edges of the four blade edges VK(i), HK(i), VK(i+1), HK(i+1) being of a same edge type or after mirror inversion of one of the blade edges are of the same edge type, and
    where the qualitative equality exists in an area between the mean meridional flow line (SLM) and one of the two main flow path boundaries (HB) in a view perpendicular to the first and third coordinate directions (s, or) for the at least two blade edges of the four blade edges VK(i), HK(i), VK(i+1), HK(i+1);
    wherein the plurality of edge types is selected from a group of edge types consisting of:
        edge type A: a substantially linear course with a very small degree of bulge of WG<0.003 is provided,
        edge type B: a slightly curved course with a small degree of bulge of 0.003<WG<0.01 is provided,
        edge type C: an at least partially curved course is provided, without curvature change and with a degree of bulge of WG>0.01 as well as with a section having a concave curvature in the upstream direction,
        edge type D: an at least partially curved course is provided, without curvature change and with a degree of bulge of WG>0.01 as well as with a section having a convex curvature in an upstream direction,
        edge type E: an at least partially curved course is provided, with a curvature change and with a degree of bulge of WG>0.01 as well as with a section having a concave curvature in the upstream direction between the curvature change point and the one of the two main flow path boundaries (HB),
        edge type F: an at least partially curved course is provided, with a curvature change and with a degree of bulge of WG>0.01 as well as with a section having a convex curvature in the upstream direction between the curvature change point and the one of the two main flow path boundaries (HB),
        edge type G: an at least partially curved course is provided, with two curvature changes and with a degree of bulge of WG>0.01 as well as with a section having a concave curvature in the upstream direction between the two curvature change points, and
        edge type H: an at least partially curved course is provided, with two curvature changes and with a degree of bulge of WG>0.01 as well as with a section having a convex curvature in the upstream direction between the two curvature change points;

wherein the qualitative equality of the at least two blade edges of the four blade edges VK(i), HK(i), VK(i+1) and HK(i+1) is provided at blade edges having the edge type chosen from the group consisting of edge type C, edge type D, edge type E, edge type F, edge type G and edge type H.

2. The blade row group in accordance with claim 1, wherein the qualitative equality of the at least two blade edges of the four blade edges VK(i), HK(i), VK(i+1), HK(i+1) is provided at blade edges of different blade rows (i, i+1) of the blade row group.

3. The blade row group in accordance with claim 2, wherein the qualitative equality is provided at the front blade edges VK(i) and VK(i+1) of the front and rear blades (i, i+1).

4. The blade row group in accordance with claim 2, wherein the qualitative equality is provided at the rear blade edge HK(i) of the front blade (i) and at the front blade edge VK(i+1) of the rear blade (i+1).

5. The blade row group in accordance with claim 2, wherein the qualitative equality is provided at the rear blade edges HK(i) and HK(i+1) of the front and rear blades (i, i+1).

6. The blade row group in accordance with claim 1, wherein the qualitative equality of the at least two blade edges of the four blade edges VK(i), HK(i), VK(i+1), HK(i+1) is provided at the same blade row (i, i+1) of the blade row group.

7. The blade row group in accordance with claim 6, wherein the qualitative equality is provided for the blade edges VK(i) and HK(i) of the front blade (i).

8. The blade row group in accordance with claim 6, wherein the qualitative equality is provided for the blade edges VK(i+1) and HK(i+1) of the rear blade (i+1).

9. The blade row group in accordance with claim 1, wherein the qualitative equality is provided at at least three blade edges of the four blade edges VK(i), HK(i), VK(i+1), HK(i+1) of the front and rear blades (i, i+1) of the blade row group.

10. The blade row group in accordance with claim 1, wherein the qualitative equality is provided at all four blade edges VK(i), HK(i), VK(i+1), HK(i+1) of the front and rear blades (i, i+1) of the blade row group.

11. The blade row group in accordance with claim 1, wherein a unidirectional qualitative equality of the four blade edges VK(i), HK(i), VK(i+1), HK(i+1) is provided such that the four blade edges VK(i), HK(i), VK(i+1) and HK(i+1) are of the same edge type.

12. The blade row group in accordance with claim 1, wherein at at least one blade edge of the four blade edges VK(i), HK(i), VK(i+1), HK(i+1) a curvature change point is provided in an area between a quarter meridional flow line (SLQ) and the one of the two main flow path boundaries (HB).

13. The blade row group in accordance with claim 1, wherein at at least one blade edge of the four blade edges VK(i), HK(i), VK(i+1), HK(i+1) a curvature change point is provided in an area between a quarter meridional flow line (SLQ) and the mean meridional flow line (SLM).

14. The blade row group in accordance with claim 12, wherein the curvature change point is provided closer to the quarter meridional flow line (SLQ) than to the mean meridional flow line (SLM).

15. The blade row group in accordance with claim 1, wherein at least at both leading edges VK(i) and VK(i+1) of the front and rear blades (i, i+1), a tilt angle of less than zero is provided, where the tilt angle (alpha) of a blade edge is measured between a straight connection of the blade edge points on the mean meridional flow line (SLM) and the one of the two main flow path boundaries (HB) and an orthogonal on a quarter meridional flow line (SLQ), and is counted positively clockwise when viewing the blade row group with a through-flow from left to right and the one of the two main flow path boundaries (HB) being the lower limit.

16. The blade row group in accordance with claim 1, wherein at least at both trailing edges HK(i) and HK(i+1) of the front and rear blades (i, i+1), a tilt angle of less than zero is provided.

17. The blade row group in accordance with claim 1, wherein at least at both trailing edges HK(i) and HK(i+1) of the front and rear blades (i, i+1), a tilt angle greater than zero is provided.

* * * * *